US012691536B2

(12) United States Patent
Purohit et al.

(10) Patent No.: US 12,691,536 B2
(45) Date of Patent: Jul. 28, 2026

(54) METHOD OF FORMING REFRIGERANT SYSTEMS

(71) Applicant: Solstice Advanced Materials US, Inc., Morris Plains, NJ (US)

(72) Inventors: Nilesh Purohit, Charlotte, NC (US); Kaimi Gao, Charlotte, NC (US); Ronald Vogl, Charlotte, NC (US); Ankit Sethi, Charlotte, NC (US); Ryan Hulse, Charlotte, NC (US)

(73) Assignee: Solstice Advanced Materials US, Inc., Morris Plains, NJ (US)

( * ) Notice: Subject to any disclaimer, the term of this patent is extended or adjusted under 35 U.S.C. 154(b) by 83 days.

(21) Appl. No.: 18/444,805

(22) Filed: Feb. 19, 2024

(65) Prior Publication Data

US 2024/0278362 A1 Aug. 22, 2024

Related U.S. Application Data

(60) Provisional application No. 63/446,926, filed on Feb. 20, 2023.

(51) Int. Cl.
| | |
|---|---|
| *F25B 45/00* | (2006.01) |
| *B23P 15/26* | (2006.01) |
| *F25B 1/00* | (2006.01) |

(52) U.S. Cl.
CPC .............. *B23P 15/26* (2013.01); *F25B 45/00* (2013.01); *F25B 1/00* (2013.01)

(58) Field of Classification Search
CPC .. F25B 2400/121; F25B 5/02; F25B 2400/22; F25B 2400/075; F25B 25/00; F25B 23/006; F25B 45/00
See application file for complete search history.

(56) References Cited

U.S. PATENT DOCUMENTS

| | | | |
|---|---|---|---|
| 2013/0263611 A1* | 10/2013 | Kearney | ................. F25B 49/02 165/200 |
| 2021/0269692 A1 | 9/2021 | Ota | |
| 2022/0235946 A1 | 7/2022 | Yokoyama | |

FOREIGN PATENT DOCUMENTS

| | | | | |
|---|---|---|---|---|
| CN | 101636466 B | * | 6/2012 | .......... C11D 7/5063 |
| EP | 3293467 | | 3/2018 | |
| KR | 20200084364 | | 7/2020 | |
| WO | WO-2021019687 A1 | * | 2/2021 | ............ F24F 1/0003 |

OTHER PUBLICATIONS

International Search Report in corresponding International Patent Application No. PCT/US2024/015958, mailing date Jun. 24, 2024, 3 pages.

* cited by examiner

*Primary Examiner* — Ana M Vazquez
(74) *Attorney, Agent, or Firm* — FisherBroyles, LLP

(57) ABSTRACT

Methods for forming an improved refrigeration system that includes an existing refrigeration circuit with a refrigerant having a GWP of greater than 1200 which comprises disconnecting the fluid connection between the existing liquid refrigerant from the existing condenser and evaporator between said existing refrigerant vapor and the suction of the compressor and then establishing a new refrigeration circuit comprising at least one of the evaporators by replacing the removed existing refrigerant with a second refrigerant comprising: (1) from about 30 to about 70% by weight of CF3I; and (2) from about 9% to about 58% by weight of HFO-1234yf; (3) from 1% to about 21.5% by weight of HFC-32.

20 Claims, 4 Drawing Sheets

METHOD OF FORMING REFRIGERANT SYSTEMS

CROSS-REFERENCE TO RELATED APPLICATIONS

The present application claims the benefit of priority to U.S. Provisional Patent Application No. 63/446,926, filed Feb. 20, 2023, the disclosure of which is incorporated by reference in its entirety.

FIELD OF THE INVENTION

This invention relates to vapor compression refrigeration systems, and in particular to methods of forming improved vapor compression refrigeration systems based on a sequence of steps for modifying an existing vapor pressure refrigeration system, such as but not limited to large, centralized supermarket refrigeration systems, that use high global warming refrigerants, such as R404A, R448, R449, R407, chlorodifluoromethane (R-22) and others.

BACKGROUND

Distributed refrigeration systems, such as refrigeration systems for cooled supermarket display cases, have typically employed air-cooled or water-cooled condensers fed by a rack of compressors. In common practice, the compressors are coupled in parallel so that they may be switched on and off in stages to adjust the system cooling capacity to the demands of the load, and the condensers are located outside, typically on the roof, or in a machine room adjacent the shopping area where the refrigeration cases are located.

Within each refrigeration case is an evaporator fed by lines from the condensers through which the expanded refrigerant circulates to cool the case. Since the cases are located on the retail floor of the supermarket and the condensers are located remotely on the roof or in a machine shop not accessible to the consumer, long runs of piping connected by joints, valving and control systems are an essential characteristic of such existing systems.

It is common practice within supermarkets to use separate systems to supply different individual cooling temperature ranges to various retail cases. For example, low temperature cases contain frozen foods, ice cream and the like, and are typically operated to maintain the contents at temperatures in the range of from about −30° C. to about −10° C., while medium temperature refrigeration is for display cases for meat, dairy products, and the like, have a typical target of maintaining the contents from about −10° C. to below about 5° C. These separate low and medium temperature systems typically will each constitute its own centralized refrigeration system, and each will normally employ its own compressor(s) or rack of compressors and its own set of refrigerant conduits to and from the compressors and condensers.

Centralized refrigeration systems have this conventional arrangement, as described generally above, and are very costly to construct and maintain. One significant component of this high cost is the long refrigerant conduit runs. Not only are long conduit runs expensive in terms of hardware and installation costs, but the quantity of refrigerant required to fill the conduits is also a significant factor. The longer the conduit run, the more refrigerant required. Environmental factors add to the cost of such systems. In such systems, it has been common to use refrigerants that perform well from the perspective of heat transfer performance and safety (low or no toxicity and low or no flammability) but are highly disadvantageous from the environmental perspective of having high global warming potentials. For example, the following refrigerants (having the indicated GWP values according to IPCC AR4) have been frequently used in such systems): R404A (GWP=3922), R22 (GWP=1760), R407F (GWP=1824), R448A (GWP=1387), R449A (GWP=1397). Since the fittings in such systems will likely experience a leak over time, such environmentally damaging refrigerants will likely escape to the atmosphere. Moreover, since long conduit runs involve more pipefitting joints, valves and the like that may potentially leak, and when a leak does occur, the longer the conduit run, the larger the quantity of high GWP refrigerant that will be lost to the atmosphere.

Efforts to address the problem of the environmental deficiencies of refrigeration systems, particularly but not limited to centralized refrigeration systems, present a substantial engineering challenge, in part because of the large cost that would be associated with a wholesale replacement of such costly and potentially very large systems. Moreover, conventional roof-mounted or machine room condenser/compressor systems provide high levels of efficiency and capacity, and any effort to modify these systems to be more environmentally attractive should desirably maintain this efficiency and capacity. The important but difficult task of achieving environmental improvement, especially in such large systems, is reflected, for example, in recently implemented regulations in the European Union which apply to large systems having refrigerant charges of 3 kilograms or higher.

Several thermodynamic and fluid flow challenges arise in connection with efforts to convert a conventional centralized refrigeration system to be more environmentally friendly while maintaining efficiency and capacity. For example, applicants have come to appreciate that it is very difficult, if not impossible, to identify an environmentally friendly refrigerant (e.g., GWP of about 150 or less (as measured by AR45)) that can be simply used in an existing refrigeration system in place of the existing high GWP refrigerant. Previously disclosed replacements for R-22 have been studied and shown to result in a cooling capacity decrease and a power requirement increase, thus resulting in an overall significant reduction in performance. (See WO2020/223196A1). This demonstrates the difficulty of developing a viable solution for this problem.

In addition, it is generally considered either important or essential in many applications, including particularly in many centralized refrigeration systems, to use compositions which are non-flammable. As used herein, the term "non-flammable" refers to compounds or compositions which are determined to be non-flammable as determined in accordance ASTM standard E-681-2009 Standard Test Method for Concentration Limits of Flammability of Chemicals (Vapors and Gases) at conditions described in ASHRAE Standard 34-2016 Designation and Safety Classification of Refrigerants and described in Appendix B1 to ASHRAE Standard 34-2016, which is incorporated herein by reference. Unfortunately, many HFCs which might otherwise be desirable as retrofits for existing centralized refrigeration systems are not non-flammable as that term is used herein. For example, the fluoroalkane difluoroethane (HFC-152a) and the fluoroalkene 1,1,1-trifluorpropene (HFO-1243zf) are each flammable and therefore not viable for use in many applications.

Regarding efficiency in use, it is important to note that a loss in refrigerant thermodynamic performance or energy efficiency may have secondary environmental impacts through increased fossil fuel usage arising from an increased demand for electrical energy.

Applicants have thus come to appreciate that it is possible to achieve significant advantage in the creation of a much more environmentally friendly centralized refrigeration system that is comparable to the old system in terms of thermodynamic performance, refrigerant safety (toxicity and flammability) and with only a relatively low capital cost expenditure in terms of system infrastructure.

SUMMARY

Applicants have found that the above-noted needs, and other needs, can be satisfied by methods for forming an improved refrigeration system, preferably large-capacity centralized refrigeration system, comprising:

(a) providing an existing refrigeration circuit comprising: (i) an existing refrigerant having a GWP of greater than 1200; (ii) a plurality of evaporators located in or near a refrigerated space containing products accessible to consumers and (iii) at least one compressor or rack of compressors and at least one condenser located remotely from said areas accessible to said consumers, wherein said existing refrigerant liquid from said condenser is fluidly connected to said evaporators via conduit(s) and wherein existing refrigerant vapor from said evaporators is returned via conduits to the suction side of said compressor or compressor rack;

(b) disconnecting the fluid connection between said existing liquid refrigerant from said condenser and at least one of said evaporators, preferably substantially all of said evaporators;

(c) disconnecting the fluid connection between said existing refrigerant vapor from said at least one of said evaporators in step (b) and said suction of said compressor or compressor rack; and (d) establishing a new first refrigeration circuit comprising said compressor or compressor rack and said condenser, wherein said existing refrigerant remains in said first refrigeration circuit or is removed and replaced;

(e) establishing a new second refrigeration circuit comprising said at least one of said evaporators, and preferably all of said evaporators, that has been disconnected in steps (b) and (c) by steps comprising: (i) removing said existing refrigerant from said evaporators and at least a portion of said conduits which have been disconnected in steps (b) and (c); and (ii) replacing said removed existing refrigerant with a second refrigerant comprising: (1) from about 30 to about 70% by weight of CF3I; (2) from about 9% to about 58% by weight of HFO-1234yf; (3) from 1% to about 21.5% by weight of HFC-32; and optionally (4) from 0.5% to 4% by weight of HFC-125, CO2 or a combination of HFC-125 and CO2, provided the total of components (1)-(4) comprise at least 95% by weight of the second refrigerant, and wherein said second refrigerant: (i) has an Occupational Exposure Limit (OEL) greater than 400; (ii) is classified as class A1 by ASHRAE Standard 34; and (iii) has a GWP of about 150 or less; and (f) thermally interconnecting said new first refrigeration circuit and said new second refrigeration circuit with an inter-circuit heat exchanger in which at least a portion of said refrigerant in said first circuit is vaporized by absorbing heat from said second circuit refrigerant vapor and wherein at least a portion of said second refrigerant vapor is condensed by transferring heat to said first circuit refrigerant liquid.

For the purposes of convenience, compositions according to the present paragraph are referred to herein as System Forming Method 1A.

The present invention also includes methods for forming an improved refrigeration system, preferably large-capacity centralized refrigeration system, comprising:

(a) providing an existing refrigeration circuit comprising: (i) an existing refrigerant having a GWP of greater than 1200; (ii) a plurality of evaporators located in or near a refrigerated space containing products accessible to consumers and (iii) at least one compressor or rack of compressors and at least one condenser located remotely from said areas accessible to said consumers, wherein said existing refrigerant liquid from said condenser is fluidly connected to said evaporators via conduit(s) and wherein existing refrigerant vapor from said evaporators is returned via conduits to the suction side of said compressor or compressor rack;

(b) disconnecting the fluid connection between said existing liquid refrigerant from said condenser and at least one of said evaporators, preferably substantially all of said evaporators;

(c) disconnecting the fluid connection between said existing refrigerant vapor from said at least one of said evaporators in step (b) and said suction of said compressor or compressor rack; and (d) establishing a new first refrigeration circuit comprising said compressor or compressor rack and said condenser, wherein said existing refrigerant remains in said first refrigeration circuit or is removed and replaced;

(e) establishing a new second refrigeration circuit comprising said at least one of said evaporators, and preferably all of said evaporators, that has been disconnected in steps (b) and (c) by steps comprising: (i) removing said existing refrigerant from said evaporators and at least a portion of said conduits which have been disconnected in steps (b) and (c); and (ii) replacing said removed existing refrigerant with a second refrigerant comprising: (1) from about 59% to about 69.5% by weight of CF3I; (2) from about 9% to about 19.5% by weight of HFO-1234yf; and (3) from 16.5% to about 21.5% by weight of HFC-32, provided the total of components (1)-(3) comprise at least 95% by weight of the second refrigerant, and wherein said second refrigerant: (i) has an Occupational Exposure Limit (OEL) greater than 400; (ii) is classified as class A1 by ASHRAE Standard 34; and (iii) has a GWP of about 150 or less; and (f) thermally interconnecting said new first refrigeration circuit and said new second refrigeration circuit with an inter-circuit heat exchanger in which at least a portion of said refrigerant in said first circuit is vaporized by absorbing heat from said second circuit refrigerant vapor and wherein at least a portion of said second refrigerant vapor is condensed by transferring heat to said first circuit refrigerant liquid.

For the purposes of convenience, compositions according to the present paragraph are referred to herein as System Forming Method 1B.

The present invention also includes methods for forming an improved refrigeration system, preferably large-capacity centralized refrigeration system comprising:

(a) providing an existing refrigeration circuit comprising: (i) an existing refrigerant having a GWP of greater than 1200; (ii) a plurality of evaporators located in or near a refrigerated space containing products accessible to consumers and (iii) at least one compressor or rack of compressors and at least one condenser located remotely from said areas accessible to said consumers, wherein said existing refrigerant liquid from said condenser is fluidly connected to said evaporators via conduit(s) and wherein existing refrigerant vapor from said evaporators is returned via conduits to the suction side of said compressor or compressor rack;

(b) disconnecting the fluid connection between said existing liquid refrigerant from said condenser and at least one of said evaporators, preferably substantially all of said evaporators;

(c) disconnecting the fluid connection between said existing refrigerant vapor from said at least one of said evaporators in step (b) and said suction of said compressor or compressor rack; and (d) establishing a new first refrigeration circuit comprising said compressor or compressor rack and said condenser, wherein said existing refrigerant remains in said first refrigeration circuit or is removed and replaced;

(e) establishing a new second refrigeration circuit comprising said at least one of said evaporators, and preferably all of said evaporators, that has been disconnected in steps (b) and (c) by steps comprising: (i) removing said existing refrigerant from said evaporators and at least a portion of said conduits which have been disconnected in steps (b) and (c); and (ii) replacing said removed existing refrigerant with a second refrigerant comprising: (1) from about 32.8 to about 53.8% by weight of CF3I; (2) from about 29% to about 58% by weight of HFO-1234yf; (3) from 2%±0.2% to about 16.5% by weight of HFC-32; and (4) 1±0.2 to 3.2±0.2% by weight of HFC-125, provided the total of components (1)-(4) comprise at least 95% by weight of the second refrigerant, and wherein said second refrigerant: (i) has an Occupational Exposure Limit (OEL) greater than 400; (ii) is classified as class A1 by ASHRAE Standard 34; and (iii) has a GWP of about 150 or less; and (f) thermally interconnecting said new first refrigeration circuit and said new second refrigeration circuit with an inter-circuit heat exchanger in which at least a portion of said refrigerant in said first circuit is vaporized by absorbing heat from said second circuit refrigerant vapor and wherein at least a portion of said second refrigerant vapor is condensed by transferring heat to said first circuit refrigerant liquid.

For the purposes of convenience, compositions according to the present paragraph are referred to herein as System Forming Method 1C.

The present invention also includes methods for forming an improved refrigeration system, preferably large-capacity centralized refrigeration system comprising:

(a) providing an existing refrigeration circuit comprising: (i) an existing refrigerant having a GWP of greater than 1200; (ii) a plurality of evaporators located in or near a refrigerated space containing products accessible to consumers and (iii) at least one compressor or rack of compressors and at least one condenser located remotely from said areas accessible to said consumers, wherein said existing refrigerant liquid from said condenser is fluidly connected to said evaporators via conduit(s) and wherein existing refrigerant vapor from said evaporators is returned via conduits to the suction side of said compressor or compressor rack;

(b) disconnecting the fluid connection between said existing liquid refrigerant from said condenser and at least one of said evaporators, preferably substantially all of said evaporators;

(c) disconnecting the fluid connection between said existing refrigerant vapor from said at least one of said evaporators in step (b) and said suction of said compressor or compressor rack; and (d) establishing a new first refrigeration circuit comprising said compressor or compressor rack and said condenser, wherein said existing refrigerant remains in said first refrigeration circuit or is removed and replaced;

(e) establishing a new second refrigeration circuit comprising said at least one of said evaporators, and preferably all of said evaporators, that has been disconnected in steps (b) and (c) by steps comprising: (i) removing said existing refrigerant from said evaporators and at least a portion of said conduits which have been disconnected in steps (b) and (c); and (ii) replacing said removed existing refrigerant with a second refrigerant comprising: (1) from about 41.5% to about 49.5% by weight of CF3I; (2) from about 36% to about 44% by weight of HFO-1234yf; (3) from about 11% to about 15% by weight of HFC-32; and (4) 1±0.2 to 3.5±0.2% by weight of CO2, provided the total of components (1)-(4) comprise at least 95% by weight of the second refrigerant, and wherein said second refrigerant: (i) has an Occupational Exposure Limit (OEL) greater than 400; (ii) is classified as class A1 by ASHRAE Standard 34; and (iii) has a GWP of about 150 or less; and (f) thermally interconnecting said new first refrigeration circuit and said new second refrigeration circuit with an inter-circuit heat exchanger in which at least a portion of said refrigerant in said first circuit is vaporized by absorbing heat from said second circuit refrigerant vapor and wherein at least a portion of said second refrigerant vapor is condensed by transferring heat to said first circuit refrigerant liquid.

For the purposes of convenience, compositions according to the present paragraph are referred to herein as System Forming Method 1D.

The present invention also includes methods for forming an improved, large-capacity centralized refrigeration system comprising:

(a) providing an existing refrigeration circuit comprising: (i) an existing refrigerant having a GWP of greater than 1200; (ii) a plurality of evaporators located in or near a refrigerated space containing products accessible to consumers and (iii) at least one compressor or rack of compressors and at least one condenser located remotely from said areas accessible to said consumers, wherein said existing refrigerant liquid from said condenser is fluidly connected to said evaporators via conduit(s) and wherein existing refrigerant vapor from said evaporators is returned via conduits to the suction side of said compressor or compressor rack;

(b) disconnecting the fluid connection between said existing liquid refrigerant from said condenser and at least one of said evaporators, preferably substantially all of said evaporators;

(c) disconnecting the fluid connection between said existing refrigerant vapor from said at least one of said evaporators in step (b) and said suction of said compressor or compressor rack; and (d) establishing a new first refrigeration circuit comprising said compressor or compressor rack and said condenser, wherein said existing refrigerant remains in said first refrigeration circuit or is removed and replaced;

(e) establishing a new second refrigeration circuit comprising said at least one of said evaporators, and preferably all of said evaporators, that has been disconnected in steps (b) and (c) by steps comprising: (i) removing said existing refrigerant from said evaporators and at least a portion of said conduits which have been disconnected in steps (b) and (c); and (ii) replacing said removed existing refrigerant with a second refrigerant comprising: (1) from about 32.8% to about 53.8% by weight of CF3I; (2) from about 29% to about 58% by weight of HFO-1234yf; (3) from 2%+/−0.2% to about 16.5% by weight of HFC-32; and (4) from 0.5% to 4% by weight of HFC-125, CO2 or a combination of HFC-125 and CO2, provided the total of components (1)-(4) comprise at least 95% by weight of the second refrigerant, and wherein said second refrigerant: (i) has an Occupational Exposure Limit (OEL) greater than 400; (ii) is classified as class A1 by ASHRAE Standard 34; and (iii) has a GWP of about 150 or less; and (f) thermally interconnecting said new first refrigeration circuit and said new second refrigeration circuit with an inter-circuit heat exchanger in which at least a portion of said refrigerant in said first circuit is vaporized by absorbing heat from said second circuit refrigerant vapor and wherein at least a portion of said second refrigerant vapor is condensed by transferring heat to said first circuit refrigerant liquid.

For the purposes of convenience, compositions according to the present paragraph are referred to herein as System Forming Method 1E.

The present invention also includes methods for forming an improved refrigeration system, preferably large-capacity centralized refrigeration system comprising:

(a) providing an existing refrigeration circuit comprising: (i) an existing refrigerant having a GWP of greater than 1200; (ii) a plurality of evaporators located in or near a refrigerated space containing products accessible to consumers and (iii) at least one compressor or rack of compressors and at least one condenser located remotely from said areas accessible to said consumers, wherein said existing refrigerant liquid from said condenser is fluidly connected to said evaporators via conduit(s) and wherein existing refrigerant vapor from said evaporators is returned via conduits to the suction side of said compressor or compressor rack;

(b) disconnecting the fluid connection between said existing liquid refrigerant from said condenser and at least one of said evaporators, preferably substantially all of said evaporators;

(c) disconnecting the fluid connection between said existing refrigerant vapor from said at least one of said evaporators in step (b) and said suction of said compressor or compressor rack; and (d) establishing a new first refrigeration circuit comprising said compressor or compressor rack and said condenser, wherein said existing refrigerant is removed and replaced with a new first refrigerant different than said existing refrigerant;

(e) establishing a new second refrigeration circuit comprising said at least one of said evaporators, and preferably all of said evaporators, that has been disconnected in steps (b) and (c) by steps comprising: (i) removing said existing refrigerant from said evaporators and at least a portion of said conduits which have been disconnected in steps (b) and (c); and (ii) replacing said removed existing refrigerant with a second refrigerant consisting essentially of: (1) about 69.5% by weight of CF3I; (2) about 9% by weight of HFO-1234yf; and (3) about 21.5% by weight of HFC-32, wherein said second refrigerant: (i) has an Occupational Exposure Limit (OEL) greater than 400; (ii) is classified as class A1 by ASHRAE Standard 34; and (iii) has a GWP of less than about 150; and (f) thermally interconnecting said new first refrigeration circuit and said new second refrigeration circuit with a new inter-circuit heat exchanger in which at least a portion of said refrigerant is said first circuit is vaporized by absorbing heat from said second circuit refrigerant vapor and wherein at least a portion of said second refrigerant vapor is condensed by transferring heat to said first circuit liquid.

For the purposes of convenience, compositions according to the present paragraph are referred to herein as System Forming Method 2A.

The present invention also includes methods for forming an improved refrigeration system, preferably large-capacity centralized refrigeration system comprising:

(a) providing an existing refrigeration circuit comprising: (i) an existing refrigerant having a GWP of greater than 1200; (ii) a plurality of evaporators located in or near a refrigerated space containing products accessible to consumers and (iii) at least one compressor or rack of compressors and at least one condenser located remotely from said areas accessible to said consumers, wherein said existing refrigerant liquid from said condenser is fluidly connected to said evaporators via conduit(s) and wherein existing refrigerant vapor from said evaporators is returned via conduits to the suction side of said compressor or compressor rack;

(b) disconnecting the fluid connection between said existing liquid refrigerant from said condenser and at least one of said evaporators, preferably substantially all of said evaporators;

(c) disconnecting the fluid connection between said existing refrigerant vapor from said at least one of said evaporators in step (b) and said suction of said compressor or compressor rack; and (d) establishing a new first refrigeration circuit comprising said compressor or compressor rack and said condenser, wherein said existing refrigerant is removed and replaced with a new first refrigerant different than said existing refrigerant;

(e) establishing a new second refrigeration circuit comprising said at least one of said evaporators, and preferably all of said evaporators, that has been disconnected in steps (b) and (c) by steps comprising: (i) removing said existing refrigerant from said evaporators and at least a portion of said conduits which have been disconnected in steps (b) and (c); and (ii) replacing said removed existing refrigerant with a second refrigerant consisting of: (1) about 69.5% by weight of CF3I; (2) about 9% by weight of HFO-1234yf; and (3) about 21.5% by weight of HFC-32, wherein said second refrigerant: (i) has an Occupational Exposure Limit (OEL) greater than 400; (ii) is classified as class A1 by ASHRAE Standard 34; and (iii) has a GWP of less than about 150; and (f) thermally interconnecting said new first refrigeration circuit and said new second refrigeration circuit with a new inter-circuit heat exchanger in which at least a portion of said refrigerant is said first circuit is vaporized by absorbing heat from said second circuit refrigerant vapor and wherein at least a portion of said second refrigerant vapor is condensed by transferring heat to said first circuit liquid.

For the purposes of convenience, compositions according to the present paragraph are referred to herein as System Forming Method 2B.

The present invention also includes methods for forming an improved refrigeration system, preferably large-capacity centralized refrigeration system comprising:

(a) providing an existing refrigeration circuit comprising: (i) an existing refrigerant having a GWP of greater than 1200; (ii) a plurality of evaporators located in or near a refrigerated space containing products accessible to consumers and (iii) at least one compressor or rack of compressors and at least one condenser located remotely from said areas accessible to said consumers, wherein said existing refrigerant liquid from said condenser is fluidly connected to said evaporators via conduit(s) and wherein existing refrigerant vapor from said evaporators is returned via conduits to the suction side of said compressor or compressor rack;

(b) disconnecting the fluid connection between said existing liquid refrigerant from said condenser and at least one of said evaporators, preferably substantially all of said evaporators;

(c) disconnecting the fluid connection between said existing refrigerant vapor from said at least one of said evaporators in step (b) and said suction of said compressor or compressor rack; and (d) establishing a new first refrigeration circuit comprising said compressor or compressor rack and said condenser, wherein said existing refrigerant is removed and replaced with a new first refrigerant different than said existing refrigerant;

(e) establishing a new second refrigeration circuit comprising said at least one of said evaporators, and preferably all of said evaporators, that has been disconnected in steps (b) and (c) by steps comprising: (i) removing said existing refrigerant from said evaporators and at least a portion of said conduits which have been disconnected in steps (b) and (c); and (ii) replacing said removed existing refrigerant with a second refrigerant consisting essentially of: (1) about 59% by weight of CF3I; (2) about 19.5% by weight of HFO-1234yf; and (3) about 21.5% by weight of HFC-32, wherein said second refrigerant: (i) has an Occupational Exposure Limit (OEL) greater than 400; (ii) is classified as class A1 by ASHRAE Standard 34; and (iii) has a GWP of less than about 150; and (f) thermally interconnecting said new first refrigeration circuit and said new second refrigeration circuit with a new inter-circuit heat exchanger in which at least a portion of said refrigerant is said first circuit is vaporized by absorbing heat from said second circuit refrigerant vapor and wherein at least a portion of said second refrigerant vapor is condensed by transferring heat to said first circuit liquid.

For the purposes of convenience, compositions according to the present paragraph are referred to herein as System Forming Method 3A.

The present invention also includes methods for forming an improved refrigeration system, preferably large-capacity centralized refrigeration system comprising:

(a) providing an existing refrigeration circuit comprising: (i) an existing refrigerant having a GWP of greater than 1200; (ii) a plurality of evaporators located in or near a refrigerated space containing products accessible to consumers and (iii) at least one compressor or rack of compressors and at least one condenser located remotely from said areas accessible to said consumers, wherein said existing refrigerant liquid from said condenser is fluidly connected to said evaporators via conduit(s) and wherein existing refrigerant vapor from said evaporators is returned via conduits to the suction side of said compressor or compressor rack;

(b) disconnecting the fluid connection between said existing liquid refrigerant from said condenser and at least one of said evaporators, preferably substantially all of said evaporators;

(c) disconnecting the fluid connection between said existing refrigerant vapor from said at least one of said evaporators in step (b) and said suction of said compressor or compressor rack; and (d) establishing a new first refrigeration circuit comprising said compressor or compressor rack and said condenser, wherein said existing refrigerant is removed and replaced with a new first refrigerant different than said existing refrigerant;

(e) establishing a new second refrigeration circuit comprising said at least one of said evaporators, and preferably all of said evaporators, that has been disconnected in steps (b) and (c) by steps comprising: (i) removing said existing refrigerant from said evaporators and at least a portion of said conduits which have been disconnected in steps (b) and (c); and (ii) replacing said removed existing refrigerant with a second refrigerant consisting of: (1) about 59% by weight of CF3I; (2) about 19.5% by weight of HFO-1234yf; and (3) about 21.5% by weight of HFC-32, wherein said second refrigerant: (i) has an Occupational Exposure Limit (OEL) greater than 400; (ii) is classified as class A1 by ASHRAE Standard 34; and (iii) has a GWP of less than about 150; and (f) thermally interconnecting said new first refrigeration circuit and said new second refrigeration circuit with a new inter-circuit heat exchanger in which at least a portion of said refrigerant is said first circuit is vaporized by absorbing heat from said second circuit refrigerant vapor and wherein at least a portion of said second refrigerant vapor is condensed by transferring heat to said first circuit liquid.

For the purposes of convenience, compositions according to the present paragraph are referred to herein as System Forming Method 3B.

The present invention also includes methods for forming an improved refrigeration system, preferably large-capacity centralized refrigeration system comprising:

(a) providing an existing refrigeration circuit comprising: (i) an existing refrigerant having a GWP of greater than 1200; (ii) a plurality of evaporators located in or near a refrigerated space containing products accessible to consumers and (iii) at least one compressor or rack of compressors and at least one condenser located remotely from said areas accessible to said consumers, wherein said existing refrigerant liquid from said condenser is fluidly connected to said evaporators via conduit(s) and wherein existing refrigerant vapor from said evaporators is returned via conduits to the suction side of said compressor or compressor rack;

(b) disconnecting the fluid connection between said existing liquid refrigerant from said condenser and at least one of said evaporators, preferably substantially all of said evaporators;

(c) disconnecting the fluid connection between said existing refrigerant vapor from said at least one of said evaporators in step (b) and said suction of said compressor or compressor rack; and (d) establishing a new first refrigeration circuit comprising said compressor or compressor rack and said condenser, wherein said existing refrigerant is removed and replaced with a new first refrigerant different than said existing refrigerant;

(e) establishing a new second refrigeration circuit comprising said at least one of said evaporators, and preferably all of said evaporators, that has been disconnected in steps (b) and (c) by steps comprising: (i) removing said existing refrigerant from said evaporators and at least a portion of said conduits which have been disconnected in steps (b) and (c); and (ii) replacing said removed existing refrigerant with a second refrigerant consisting essentially of: (1) about 38% by weight of CF3I; (2) about 54% by weight of HFO-1234yf; and (3) about 5% by weight of HFC-32; and (4) about 3%+1/−0.2% HFC-125, wherein said second refrigerant: (i) has an Occupational Exposure Limit (OEL) greater than 400; (ii) is classified as class A1 by ASHRAE Standard 34; and (iii) has a GWP of less than about 150; and (f) thermally interconnecting said new first refrigeration circuit and said new second refrigeration circuit with a new inter-circuit heat exchanger in which at least a portion of said refrigerant is said first circuit is vaporized by absorbing heat from said second circuit refrigerant vapor and wherein at least a portion of said second refrigerant vapor is condensed by transferring heat to said first circuit liquid.

For the purposes of convenience, compositions according to the present paragraph are referred to herein as System Forming Method 4A.

The present invention also includes methods for forming an improved refrigeration system, preferably large-capacity centralized refrigeration system comprising:

(a) providing an existing refrigeration circuit comprising: (i) an existing refrigerant having a GWP of greater than 1200; (ii) a plurality of evaporators located in or near a refrigerated space containing products accessible to consumers and (iii) at least one compressor or rack of compressors and at least one condenser located remotely from said areas accessible to said consumers, wherein said existing refrigerant liquid from said condenser is fluidly connected to said evaporators via conduit(s) and wherein existing refrigerant vapor from said evaporators is returned via conduits to the suction side of said compressor or compressor rack;

(b) disconnecting the fluid connection between said existing liquid refrigerant from said condenser and at least one of said evaporators, preferably substantially all of said evaporators;

(c) disconnecting the fluid connection between said existing refrigerant vapor from said at least one of said evaporators in step (b) and said suction of said compressor or compressor rack; and (d) establishing a new first refrigeration circuit comprising said compressor or compressor rack and said condenser, wherein said existing refrigerant is removed and replaced with a new first refrigerant different than said existing refrigerant;

(e) establishing a new second refrigeration circuit comprising said at least one of said evaporators, and preferably all of said evaporators, that has been disconnected in steps (b) and (c) by steps comprising: (i) removing said existing refrigerant from said evaporators and at least a portion of said conduits which have been disconnected in steps (b) and (c); (ii) replacing said removed existing refrigerant with a second refrigerant consisting of: (1) about 38% by weight of CF3I; (2) about 54% by weight of HFO-1234yf; and (3) about 5% by weight of HFC-32; and (4) about 3%+1/−0.2% HFC-125, wherein said second refrigerant: (i) has an Occupational Exposure Limit (OEL) greater than 400; (ii) is classified as class A1 by ASHRAE Standard 34; and (iii) has a GWP of less than about 150; and (f) thermally interconnecting said new first refrigeration circuit and said new second refrigeration circuit with a new inter-circuit heat exchanger in which at least a portion of said refrigerant is said first circuit is vaporized by absorbing heat from said second circuit refrigerant vapor and wherein at least a portion of said second refrigerant vapor is condensed by transferring heat to said first circuit liquid.

For the purposes of convenience, compositions according to the present paragraph are referred to herein as System Forming Method 4B.

The present invention also includes methods for forming an improved refrigeration system, preferably large-capacity centralized refrigeration system comprising:

(a) providing an existing refrigeration circuit comprising: (i) an existing refrigerant having a GWP of greater than 1200; (ii) a plurality of evaporators located in or near a refrigerated space containing products accessible to consumers and (iii) at least one compressor or rack of compressors and at least one condenser located remotely from said areas accessible to said consumers, wherein said existing refrigerant liquid from said condenser is fluidly connected to said evaporators via conduit(s) and wherein existing refrigerant vapor from said evaporators is returned via conduits to the suction side of said compressor or compressor rack;

(b) disconnecting the fluid connection between said existing liquid refrigerant from said condenser and at least one of said evaporators, preferably substantially all of said evaporators;

(c) disconnecting the fluid connection between said existing refrigerant vapor from said at least one of said evaporators in step (b) and said suction of said compressor or compressor rack; and (d) establishing a new first refrigeration circuit comprising said compressor or compressor rack and said condenser, wherein said existing refrigerant remains in said first refrigeration circuit or is removed and replaced;

(e) establishing a new second refrigeration circuit comprising said at least one of said evaporators, and preferably all of said evaporators, that has been disconnected in steps (b) and (c) by steps comprising: (i) removing said existing refrigerant from said evaporators and at least a portion of said conduits which have been disconnected in steps (b) and (c); and (ii) replacing said removed existing refrigerant with a second refrigerant comprising: (1) about 45% by weight of CF3I; (2) about 40% by weight of HFO-1234yf; (3) about 13% by weight of HFC-32; and (4) 2%+1/−0.2% by weight of CO2, wherein said second refrigerant: (i) has an Occupational Exposure Limit (OEL) greater than 400; (ii) is classified as class A1 by ASHRAE Standard 34; and (iii) has a GWP of about 150 or less; and

(f) thermally interconnecting said new first refrigeration circuit and said new second refrigeration circuit with an inter-circuit heat exchanger in which at least a portion of said refrigerant in said first circuit is vaporized by absorbing heat from said second circuit refrigerant vapor and wherein at least a portion of said second refrigerant vapor is condensed by transferring heat to said first circuit refrigerant liquid.

For the purposes of convenience, compositions according to the present paragraph are referred to herein as System Forming Method 5A.

The present invention also includes methods for forming an improved refrigeration system, preferably large-capacity centralized refrigeration system comprising:

(a) providing an existing refrigeration circuit comprising: (i) an existing refrigerant having a GWP of greater than 1200; (ii) a plurality of evaporators located in or near a refrigerated space containing products accessible to consumers and (iii) at least one compressor or rack of compressors and at least one condenser located remotely from said areas accessible to said consumers, wherein said existing refrigerant liquid from said condenser is fluidly connected to said evaporators via conduit(s) and wherein existing refrigerant vapor from said evaporators is returned via conduits to the suction side of said compressor or compressor rack;

(b) disconnecting the fluid connection between said existing liquid refrigerant from said condenser and at least one of said evaporators, preferably substantially all of said evaporators;

(c) disconnecting the fluid connection between said existing refrigerant vapor from said at least one of said evaporators in step (b) and said suction of said compressor or compressor rack; and (d) establishing a new first refrigeration circuit comprising said compressor or compressor rack and said condenser, wherein said existing refrigerant is removed and replaced with a new first refrigerant different than said existing refrigerant;

(e) establishing a new second refrigeration circuit comprising said at least one of said evaporators, and preferably all of said evaporators, that has been disconnected in steps (b) and (c) by steps comprising: (i) removing said existing refrigerant from said evaporators and at least a portion of said conduits which have been disconnected in steps (b) and (c); (ii) replacing said removed existing refrigerant with a second refrigerant consisting essentially of: (1) about 45% by weight of CF3I; (2) about 40% by weight of HFO-1234yf; and (3) about 13% by weight of HFC-32; and (4) about 2+1/−0.2% CO2, wherein said second refrigerant: (i) has an Occupational Exposure Limit (OEL) greater than 400; (ii) is classified as class A1 by ASHRAE Standard 34; and (iii) has a GWP of less than about 150; and (f) thermally interconnecting said new first refrigeration circuit and said new second refrigeration circuit with a new inter-circuit heat exchanger in which at least a portion of said refrigerant is said first circuit is vaporized by absorbing heat from said second circuit refrigerant vapor and wherein at least a portion of said second refrigerant vapor is condensed by transferring heat to said first circuit liquid.

For the purposes of convenience, compositions according to the present paragraph are referred to herein as System Forming Method 5B.

The present invention also includes methods for forming an improved refrigeration system, preferably large-capacity centralized refrigeration system comprising:

(a) providing an existing refrigeration circuit comprising: (i) an existing refrigerant having a GWP of greater than 1200; (ii) a plurality of evaporators located in or near a refrigerated space containing products accessible to consumers and (iii) at least one compressor or rack of compressors and at least one condenser located remotely from said areas accessible to said consumers, wherein said existing refrigerant liquid from said condenser is fluidly connected to said evaporators via conduit(s) and wherein existing refrigerant vapor from said evaporators is returned via conduits to the suction side of said compressor or compressor rack;

(b) disconnecting the fluid connection between said existing liquid refrigerant from said condenser and at least one of said evaporators, preferably substantially all of said evaporators;

(c) disconnecting the fluid connection between said existing refrigerant vapor from said at least one of said evaporators in step (b) and said suction of said compressor or compressor rack; and (d) establishing a new first refrigeration circuit comprising said compressor or compressor rack and said condenser, wherein said existing refrigerant is removed and replaced with a new first refrigerant different than said existing refrigerant;

(e) establishing a new second refrigeration circuit comprising said at least one of said evaporators, and preferably all of said evaporators, that has been disconnected in steps (b) and (c) by steps comprising: (i) removing said existing refrigerant from said evaporators and at least a portion of said conduits which have been disconnected in steps (b) and (c); (ii) replacing said removed existing refrigerant with a second refrigerant consisting of: (1) about 45% by weight of CF3I; (2) about 40% by weight of HFO-1234yf; and (3) about 13% by weight of HFC-32; and (4) about 2+1/−0.2% CO2, wherein said second refrigerant: (i) has an Occupational Exposure Limit (OEL) greater than 400; (ii) is classified as class A1 by ASHRAE Standard 34; and (iii) has a GWP of less than about 150; and (f) thermally interconnecting said new first refrigeration circuit and said new second refrigeration circuit with a new inter-circuit heat exchanger in which at least a portion of said refrigerant is said first circuit is vaporized by absorbing heat from said second circuit refrigerant vapor and wherein at least a portion of said second refrigerant vapor is condensed by transferring heat to said first circuit liquid.

For the purposes of convenience, compositions according to the present paragraph are referred to herein as System Forming Method 5C.

The present invention also includes methods for forming an improved refrigeration system, preferably large-capacity centralized refrigeration system comprising:

(a) providing an existing refrigeration circuit comprising: (i) an existing refrigerant having a GWP of greater than 1200; (ii) a plurality of evaporators located in or near a refrigerated space containing products accessible to consumers and (iii) at least one compressor or rack of compressors and at least one condenser located remotely from said areas accessible to said consumers, wherein said existing refrigerant liquid from said condenser is fluidly connected to said evaporators via conduit(s) and wherein existing refrigerant vapor from said evaporators is returned via conduits to the suction side of said compressor or compressor rack;

(b) disconnecting the fluid connection between said existing liquid refrigerant from said condenser and at least one of said evaporators, preferably substantially all of said evaporators;

(c) disconnecting the fluid connection between said existing refrigerant vapor from said at least one of said evaporators in step (b) and said suction of said compressor or compressor rack; and (d) establishing a new first refrigeration circuit comprising said compressor or compressor rack and said condenser, wherein said existing refrigerant is removed and replaced with a new first refrigerant different than said existing refrigerant;

(e) establishing a new second refrigeration circuit comprising said at least one of said evaporators, and preferably all of said evaporators, that has been disconnected in steps (b) and (c) by steps comprising: (i) removing said existing refrigerant from said evaporators and at least a portion of said conduits which have been disconnected in steps (b) and (c); (ii) replacing said removed existing refrigerant with a second refrigerant consisting of: (1) 32.8 to 42.8% by weight of CF3I; (2) from 48% to 58% by weight of HFO-1234yf; (3) from 2% to 6% by weight of HFC-32; and (4) 1±0.2 to 3.2±0.2% by weight of HFC-125, wherein said second refrigerant: (i) has an Occupational Exposure Limit (OEL) greater than 400; (ii) is classified as class A1 by ASHRAE Standard 34; and (iii) has a GWP of less than about 150; and (f) thermally interconnecting said new first refrigeration circuit and said new second refrigeration circuit with a new inter-circuit heat exchanger in which at least a portion of said refrigerant is said first circuit is vaporized by absorbing heat from said second circuit refrigerant vapor and wherein at least a portion of said second refrigerant vapor is condensed by transferring heat to said first circuit liquid.

For the purposes of convenience, compositions according to the present paragraph are referred to herein as System Forming Method 6.

The present invention also includes methods for forming an improved refrigeration system, preferably large-capacity centralized refrigeration system comprising:

(a) providing an existing refrigeration circuit comprising: (i) an existing refrigerant having a GWP of greater than 1200; (ii) a plurality of evaporators located in or near a refrigerated space containing products accessible to consumers and (iii) at least one compressor or rack of compressors and at least one condenser located remotely from said areas accessible to said consumers, wherein said existing refrigerant liquid from said condenser is fluidly connected to said evaporators via conduit(s) and wherein existing refrigerant vapor from said evaporators is returned via conduits to the suction side of said compressor or compressor rack;

(b) disconnecting the fluid connection between said existing liquid refrigerant from said condenser and at least one of said evaporators, preferably substantially all of said evaporators;

(c) disconnecting the fluid connection between said existing refrigerant vapor from said at least one of said evaporators in step (b) and said suction of said compressor or compressor rack; and (d) establishing a new first refrigeration circuit comprising said compressor or compressor rack and said condenser, wherein said existing refrigerant remains in said first refrigeration circuit or is removed and replaced; (e) establishing a new second refrigeration circuit comprising said at least one of said evaporators, and preferably all of said evaporators, that has been disconnected in steps (b) and (c) by steps comprising: (i) removing said existing refrigerant from said evaporators and at least a portion of said conduits which have been disconnected in steps (b) and (c); (ii) replacing said removed existing refrigerant with a second refrigerant comprising: (1) about 38% by weight of CF3I; (2) about 54% by weight of HFO-1234yf; (3) 5%±0.5% by weight of HFC-32; and (4) 1±0.2 to 3.2±0.2% by weight of HFC-125, wherein said second refrigerant: (i) has an Occupational Exposure Limit (OEL) greater than 400; (ii) is classified as class A1 by ASHRAE Standard 34; and (iii) has a GWP of about 150 or less; and (f) thermally interconnecting said new first refrigeration circuit and said new second refrigeration circuit with an inter-circuit heat exchanger in which at least a portion of said refrigerant in said first circuit is vaporized by absorbing heat from said second circuit refrigerant vapor and wherein at least a portion of said second refrigerant vapor is condensed by transferring heat to said first circuit refrigerant liquid.

For the purposes of convenience, compositions according to the present paragraph are referred to herein as System Forming Method 7.

The present invention also includes methods for forming an improved refrigeration system, preferably large-capacity centralized refrigeration system comprising:

(a) providing an existing refrigeration circuit comprising: (i) an existing refrigerant having a GWP of greater than 1200; (ii) a plurality of evaporators located in or near a refrigerated space containing products accessible to consumers and (iii) at least one compressor or rack of compressors and at least one condenser located remotely from said areas accessible to said consumers, wherein said existing refrigerant liquid from said condenser is fluidly connected to said evaporators via conduit(s) and wherein existing refrigerant vapor from said evaporators is returned via conduits to the suction side of said compressor or compressor rack;

(b) disconnecting the fluid connection between said existing liquid refrigerant from said condenser and at least one of said evaporators, preferably substantially all of said evaporators;

(c) disconnecting the fluid connection between said existing refrigerant vapor from said at least one of said evaporators in step (b) and said suction of said compressor or compressor rack; and (d) establishing a new first refrigeration circuit comprising said compressor or compressor rack and said condenser, wherein said existing refrigerant is removed and replaced with a new first refrigerant different than said existing refrigerant;

(e) establishing a new second refrigeration circuit comprising said at least one of said evaporators, and preferably all of said evaporators, that has been disconnected in steps (b) and (c) by steps comprising: (i) removing said existing refrigerant from said evaporators and at least a portion of said conduits which have been disconnected in steps (b) and (c); (ii) replacing said removed existing refrigerant with a second refrigerant consisting essentially of: (1) about 38% by weight of CF3I; (2) about 54% by weight of HFO-1234yf; (3) 5%±0.5% by weight of HFC-32; and (4) 1±0.2 to 3.2±0.2% by weight of HFC-125, wherein said second refrigerant: (i) has an Occupational Exposure Limit (OEL) greater than 400; (ii) is classified as class A1 by ASHRAE Standard 34; and (iii) has a GWP of less than about 150; and (f) thermally interconnecting said new first refrigeration circuit and said new second refrigeration circuit with a new inter-circuit heat exchanger in which at least a portion of said refrigerant is said first circuit is vaporized by absorbing heat from said second circuit refrigerant vapor and wherein at least a portion of said second refrigerant vapor is condensed by transferring heat to said first circuit liquid.

For the purposes of convenience, compositions according to the present paragraph are referred to herein as System Forming Method 8.

The present invention also includes methods for forming an improved refrigeration system, preferably large-capacity centralized refrigeration system comprising:

(a) providing an existing refrigeration circuit comprising: (i) an existing refrigerant having a GWP of greater than 1200; (ii) a plurality of evaporators located in or near a refrigerated space containing products accessible to consumers and (iii) at least one compressor or rack of compressors and at least one condenser located remotely from said areas accessible to said consumers, wherein said existing refrigerant liquid from said condenser is fluidly connected to said evaporators via conduit(s) and wherein existing refrigerant vapor from said evaporators is returned via conduits to the suction side of said compressor or compressor rack;

(b) disconnecting the fluid connection between said existing liquid refrigerant from said condenser and at least one of said evaporators, preferably substantially all of said evaporators;

(c) disconnecting the fluid connection between said existing refrigerant vapor from said at least one of said evaporators in step (b) and said suction of said compressor or compressor rack; and (d) establishing a new first refrigeration circuit comprising said compressor or compressor rack and said condenser, wherein said existing refrigerant remains in said first refrigeration circuit or is removed and replaced;

(e) establishing a new second refrigeration circuit comprising said at least one of said evaporators, and preferably all of said evaporators, that has been disconnected in steps (b) and (c) by steps comprising: (i) removing said existing refrigerant from said evaporators and at least a portion of said conduits which have been disconnected in steps (b) and (c); (ii) replacing said removed existing refrigerant with a second refrigerant comprising: (1) 38%±1% by weight of CF3I; (2) about 54%±1% by weight of HFO-1234yf; (3) 5%±1% % by weight of HFC-32; and (4) 3±0.2% by weight of HFC-125, wherein said second refrigerant: (i) has an Occupational Exposure Limit (OEL) greater than 400; (ii) is classified as class A1 by ASHRAE Standard 34; and (iii) has a GWP of about 150 or less; and (f) thermally interconnecting said new first refrigeration circuit and said new second refrigeration circuit with an inter-circuit heat exchanger in which at least a portion of said refrigerant in said first circuit is vaporized by absorbing heat from said second circuit refrigerant vapor and wherein at least a portion of said second refrigerant vapor is condensed by transferring heat to said first circuit refrigerant liquid.

For the purposes of convenience, compositions according to the present paragraph are referred to herein as System Forming Method 9A.

The present invention also includes methods for forming an improved refrigeration system, preferably large-capacity centralized refrigeration system comprising:

(a) providing an existing refrigeration circuit comprising: (i) an existing refrigerant having a GWP of greater than 1200; (ii) a plurality of evaporators located in or near a refrigerated space containing products accessible to consumers and (iii) at least one compressor or rack of compressors and at least one condenser located remotely from said areas accessible to said consumers, wherein said existing refrigerant liquid from said condenser is fluidly connected to said evaporators via conduit(s) and wherein existing refrigerant vapor from said evaporators is returned via conduits to the suction side of said compressor or compressor rack;

(b) disconnecting the fluid connection between said existing liquid refrigerant from said condenser and at least one of said evaporators, preferably substantially all of said evaporators;

(c) disconnecting the fluid connection between said existing refrigerant vapor from said at least one of said evaporators in step (b) and said suction of said compressor or compressor rack; and (d) establishing a new first refrigeration circuit comprising said compressor or compressor rack and said condenser, wherein said existing refrigerant is removed and replaced with a new first refrigerant different than said existing refrigerant;

(e) establishing a new second refrigeration circuit comprising said at least one of said evaporators, and preferably all of said evaporators, that has been disconnected in steps (b) and (c) by steps comprising: (i) removing said existing refrigerant from said evaporators and at least a portion of said conduits which have been disconnected in steps (b) and (c); and (ii) replacing said removed existing refrigerant with a second refrigerant consisting essentially of: (1) 38%±1% by weight of CF3I; (2) about 54%±1% by weight of HFO-1234yf; (3) 5%±1% % by weight of HFC-32; and (4) 3±0.2% by weight of HFC-125, wherein said second refrigerant: (i) has an Occupational Exposure Limit (OEL) greater than 400; (ii) is classified as class A1 by ASHRAE Standard 34; and (iii) has a GWP of less than about 150; and (f) thermally interconnecting said new first refrigeration circuit and said new second refrigeration circuit with a new inter-circuit heat exchanger in which at least a portion of said refrigerant is said first circuit is vaporized by absorbing heat from said second circuit refrigerant vapor and wherein at least a portion of said second refrigerant vapor is condensed by transferring heat to said first circuit liquid.

For the purposes of convenience, compositions according to the present paragraph are referred to herein as System Forming Method 9B.

The present invention also includes methods for forming an improved refrigeration system, preferably large-capacity centralized refrigeration system comprising:

(a) providing an existing refrigeration circuit comprising: (i) an existing refrigerant having a GWP of greater than 1200; (ii) a plurality of evaporators located in or near a refrigerated space containing products accessible to consumers and (iii) at least one compressor or rack of compressors and at least one condenser located remotely from said areas accessible to said consumers, wherein said existing refrigerant liquid from said condenser is fluidly connected to said evaporators via conduit(s) and wherein existing refrigerant vapor from said evaporators is returned via conduits to the suction side of said compressor or compressor rack;

(b) disconnecting the fluid connection between said existing liquid refrigerant from said condenser and at least one of said evaporators, preferably substantially all of said evaporators;

(c) disconnecting the fluid connection between said existing refrigerant vapor from said at least one of said evaporators in step (b) and said suction of said compressor or compressor rack; and (d) establishing a new first refrigeration circuit comprising said compressor or compressor rack and said condenser, wherein said existing refrigerant is removed and replaced with a new first refrigerant different than said existing refrigerant;

(e) establishing a new second refrigeration circuit comprising said at least one of said evaporators, and preferably all of said evaporators, that has been disconnected in steps (b) and (c) by steps comprising: (i) removing said existing refrigerant from said evaporators and at least a portion of said conduits which have been disconnected in steps (b) and (c); and (ii) replacing said removed existing refrigerant with a second refrigerant consisting of: (1) 38%±1% by weight of CF3I; (2) about 54%±1% by weight of HFO-1234yf; (3) 5%±1% % by weight of HFC-32; and (4) 3±0.2% by weight of HFC-125, wherein said second refrigerant: (i) has an Occupational Exposure Limit (OEL) greater than 40; (ii) is classified as class A1 by ASHRAE Standard 34; and (iii) has a GWP of less than about 150; and (f) thermally interconnecting said new first refrigeration circuit and said new second refrigeration circuit with a new inter-circuit heat exchanger in which at least a portion of said refrigerant is said first circuit is vaporized by absorbing heat from said second circuit refrigerant vapor and wherein at least a portion of said second refrigerant vapor is condensed by transferring heat to said first circuit liquid.

For the purposes of convenience, compositions according to the present paragraph are referred to herein as System Forming Method 9C.

The present invention also includes methods for forming an improved refrigeration system, preferably large-capacity centralized refrigeration system comprising:

(a) providing an existing refrigeration circuit comprising: (i) an existing refrigerant having a GWP of greater than 1200; (ii) a plurality of evaporators located in or near a refrigerated space containing products accessible to consumers and (iii) at least one compressor or rack of compressors and at least one condenser located remotely from said areas accessible to said consumers, wherein said existing refrigerant liquid from said condenser is fluidly connected to said evaporators via conduit(s) and wherein existing refrigerant vapor from said evaporators is returned via conduits to the suction side of said compressor or compressor rack;

(b) disconnecting the fluid connection between said existing liquid refrigerant from said condenser and at least one of said evaporators, preferably substantially all of said evaporators;

(c) disconnecting the fluid connection between said existing refrigerant vapor from said at least one of said evaporators in step (b) and said suction of said compressor or compressor rack; and (d) establishing a new first refrigeration circuit comprising said compressor or compressor rack and said condenser, wherein said existing refrigerant is removed and replaced with a new first refrigerant different than said existing refrigerant;

(e) establishing a new second refrigeration circuit comprising said at least one of said evaporators, and preferably all of said evaporators, that has been disconnected in steps (b) and (c) by steps comprising: (i) removing said existing refrigerant from said evaporators and at least a portion of said conduits which have been disconnected in steps (b) and (c); (ii) replacing said removed existing refrigerant with a second refrigerant consisting of: (1) 45% to 55% by weight of CF3I; (2) from 30% to 40% by weight of HFO-1234yf; (3) from 10% to 20% by weight of HFC-32; and (4) 1 to 2% by weight of HFC-125, wherein said second refrigerant: (i) has an Occupational Exposure Limit (OEL) greater than 40; (ii) is classified as class A1 by ASHRAE Standard 34; and (iii) has a GWP of less than about 150; and (f) thermally interconnecting said new first refrigeration circuit and said new second refrigeration circuit with a new inter-circuit heat exchanger in which at least a portion of said refrigerant is said first circuit is vaporized by absorbing heat from said second circuit refrigerant vapor and wherein at least a portion of said second refrigerant vapor is condensed by transferring heat to said first circuit liquid.

For the purposes of convenience, compositions according to the present paragraph are referred to herein as System Forming Method 10.

The present invention also includes methods for forming an improved refrigeration system, preferably large-capacity centralized refrigeration system comprising:

(a) providing an existing refrigeration circuit comprising: (i) an existing refrigerant having a GWP of greater than 1200; (ii) a plurality of evaporators located in or near a refrigerated space containing products accessible to consumers and (iii) at least one compressor or rack of compressors and at least one condenser located remotely from said areas accessible to said consumers, wherein said existing refrigerant liquid from said condenser is fluidly connected to said evaporators via conduit(s) and wherein existing refrigerant vapor from said evaporators is returned via conduits to the suction side of said compressor or compressor rack;

(b) disconnecting the fluid connection between said existing liquid refrigerant from said condenser and at least one of said evaporators, preferably substantially all of said evaporators;

(c) disconnecting the fluid connection between said existing refrigerant vapor from said at least one of said evaporators in step (b) and said suction of said compressor or compressor rack; and (d) establishing a new first refrigeration circuit comprising said compressor or compressor rack and said condenser, wherein said existing refrigerant remains in said first refrigeration circuit or is removed and replaced;

(e) establishing a new second refrigeration circuit comprising said at least one of said evaporators, and preferably all of said evaporators, that has been disconnected in steps (b) and (c) by steps comprising: (i) removing said existing refrigerant from said evaporators and at least a portion of said conduits which have been disconnected in steps (b) and (c); and (ii) replacing said removed existing refrigerant with a second refrigerant comprising: (1) about 50% by weight of CF3I; (2) about 34.5% by weight of HFO-1234yf; (3) 5%±0.5% by weight of HFC-32; and (4) 1.5%±0.2 by weight of HFC-125, wherein said second refrigerant: (i) has an Occupational Exposure Limit (OEL) greater than 400; (ii) is classified as class A1 by ASHRAE Standard 34; and (iii) has a GWP of about 150 or less; and (f) thermally interconnecting said new first refrigeration circuit and said new second refrigeration circuit with an inter-circuit heat exchanger in which at least a portion of said refrigerant in said first circuit is vaporized by absorbing heat from said second circuit refrigerant vapor and wherein at least a portion of said second refrigerant vapor is condensed by transferring heat to said first circuit refrigerant liquid.

For the purposes of convenience, compositions according to the present paragraph are referred to herein as System Forming Method 11A.

The present invention also includes methods for forming an improved refrigeration system, preferably large-capacity centralized refrigeration system comprising:

(a) providing an existing refrigeration circuit comprising: (i) an existing refrigerant having a GWP of greater than 1200; (ii) a plurality of evaporators located in or near a refrigerated space containing products accessible to consumers and (iii) at least one compressor or rack of compressors and at least one condenser located remotely from said areas accessible to said consumers, wherein said existing refrigerant liquid from said condenser is fluidly connected to said evaporators via conduit(s) and wherein existing refrigerant vapor from said evaporators is returned via conduits to the suction side of said compressor or compressor rack;

(b) disconnecting the fluid connection between said existing liquid refrigerant from said condenser and at least one of said evaporators, preferably substantially all of said evaporators;

(c) disconnecting the fluid connection between said existing refrigerant vapor from said at least one of said evaporators in step (b) and said suction of said compressor or compressor rack; and (d) establishing a new first refrigeration circuit comprising said compressor or compressor rack and said condenser, wherein said existing refrigerant is removed and replaced with a new first refrigerant different than said existing refrigerant;

(e) establishing a new second refrigeration circuit comprising said at least one of said evaporators, and preferably all of said evaporators, that has been disconnected in steps (b) and (c) by steps comprising: (i) removing said existing refrigerant from said evaporators and at least a portion of said conduits which have been disconnected in steps (b) and (c); and (ii) replacing said removed existing refrigerant with a second refrigerant consisting essentially of: (1) about 50% by weight of CF3I; (2) about 34.5% by weight of HFO-1234yf; (3) 5%±0.5% by weight of HFC-32; and (4) 1.5%±0.2 by weight of HFC-125, wherein said second refrigerant: (i) has an Occupational Exposure Limit (OEL) greater than 400; (ii) is classified as class A1 by ASHRAE Standard 34; and (iii) has a GWP of less than about 150; and (f) thermally interconnecting said new first refrigeration circuit and said new second refrigeration circuit with a new inter-circuit heat exchanger in which at least a portion of said refrigerant is said first circuit is vaporized by absorbing heat from said second circuit refrigerant vapor and wherein at least a portion of said second refrigerant vapor is condensed by transferring heat to said first circuit liquid.

For the purposes of convenience, compositions according to the present paragraph are referred to herein as System Forming Method 11B.

The present invention also includes methods for forming an improved refrigeration system, preferably large-capacity centralized refrigeration system comprising:

(a) providing an existing refrigeration circuit comprising: (i) an existing refrigerant having a GWP of greater than 1200; (ii) a plurality of evaporators located in or near a refrigerated space containing products accessible to consumers and (iii) at least one compressor or rack of compressors and at least one condenser located remotely from said areas accessible to said consumers, wherein said existing refrigerant liquid from said condenser is fluidly connected to said evaporators via conduit(s) and wherein existing refrigerant vapor from said evaporators is returned via conduits to the suction side of said compressor or compressor rack;

(b) disconnecting the fluid connection between said existing liquid refrigerant from said condenser and at least one of said evaporators, preferably substantially all of said evaporators;

(c) disconnecting the fluid connection between said existing refrigerant vapor from said at least one of said evaporators in step (b) and said suction of said compressor or compressor rack; and (d) establishing a new first refrigeration circuit comprising said compressor or compressor rack and said condenser, wherein said existing refrigerant is removed and replaced with a new first refrigerant different than said existing refrigerant;

(e) establishing a new second refrigeration circuit comprising said at least one of said evaporators, and preferably all of said evaporators, that has been disconnected in steps (b) and (c) by steps comprising: (i) removing said existing refrigerant from said evaporators and at least a portion of said conduits which have been disconnected in steps (b) and (c); and (ii) replacing said removed existing refrigerant with a second refrigerant consisting of: (1) about 50% by weight of CF3I; (2) about 34.5% by weight of HFO-1234yf; (3) 5%±0.5% by weight of HFC-32; and (4) 1.5%±0.2 by weight of HFC-125, wherein said second refrigerant: (i) has an Occupational Exposure Limit (OEL) greater than 40; (ii) is classified as class A1 by ASHRAE Standard 34; and (iii) has a GWP of less than about 150; and (f) thermally interconnecting said new first refrigeration circuit and said new second refrigeration circuit with a new inter-circuit heat exchanger in which at least a portion of said refrigerant is said first circuit is vaporized by absorbing heat from said second circuit refrigerant vapor and wherein at least a portion of said second refrigerant vapor is condensed by transferring heat to said first circuit liquid.

For the purposes of convenience, compositions according to the present paragraph are referred to herein as System Forming Method 11C.

The present invention also includes methods for forming an improved refrigeration system, preferably large-capacity centralized refrigeration system comprising:

(a) providing an existing refrigeration circuit comprising: (i) an existing refrigerant having a GWP of greater than 1200; (ii) a plurality of evaporators located in or near a refrigerated space containing products accessible to consumers and (iii) at least one compressor or rack of compressors and at least one condenser located remotely from said areas accessible to said consumers, wherein said existing refrigerant liquid from said condenser is fluidly connected to said evaporators via conduit(s) and wherein existing refrigerant vapor from said evaporators is returned via conduits to the suction side of said compressor or compressor rack;

(b) disconnecting the fluid connection between said existing liquid refrigerant from said condenser and at least one of said evaporators, preferably substantially all of said evaporators;

(c) disconnecting the fluid connection between said existing refrigerant vapor from said at least one of said evaporators in step (b) and said suction of said compressor or compressor rack; and (d) establishing a new first refrigeration circuit comprising said compressor or compressor rack and said condenser, wherein said existing refrigerant remains in said first refrigeration circuit or is removed and replaced; (e) establishing a new second refrigeration circuit comprising said at least one of said evaporators, and preferably all of said evaporators, that has been disconnected in steps (b) and (c) by steps comprising: (i) removing said existing refrigerant from said evaporators and at least a portion of said conduits which have been disconnected in steps (b) and (c); and (ii) replacing said removed existing refrigerant with a second refrigerant comprising: (1) 50%±1% by weight of CF3I; (2) about 34.5%±1% by weight of HFO-1234yf; (3) 14%±1% % by weight of HFC-32; and (4) 1.5%±0.2% by weight of HFC-125, wherein said second refrigerant: (i) has an Occupational Exposure Limit (OEL) greater than 400; (ii) is classified as class A1 by ASHRAE Standard 34; and (iii) has a GWP of about 150 or less; and (f) thermally interconnecting said new first refrigeration circuit and said new second refrigeration circuit with an inter-circuit heat exchanger in which at least a portion of said refrigerant in said first circuit is vaporized by absorbing heat from said second circuit refrigerant vapor and wherein at least a portion of said second refrigerant vapor is condensed by transferring heat to said first circuit refrigerant liquid.

For the purposes of convenience, compositions according to the present paragraph are referred to herein as System Forming Method 12A.

The present invention also includes methods for forming an improved refrigeration system, preferably large-capacity centralized refrigeration system comprising:

(a) providing an existing refrigeration circuit comprising: (i) an existing refrigerant having a GWP of greater than 1200; (ii) a plurality of evaporators located in or near a refrigerated space containing products accessible to consumers and (iii) at least one compressor or rack of compressors and at least one condenser located remotely from said areas accessible to said consumers, wherein said existing refrigerant liquid from said condenser is fluidly connected to said evaporators via conduit(s) and wherein existing refrigerant vapor from said evaporators is returned via conduits to the suction side of said compressor or compressor rack;

(b) disconnecting the fluid connection between said existing liquid refrigerant from said condenser and at least one of said evaporators, preferably substantially all of said evaporators;

(c) disconnecting the fluid connection between said existing refrigerant vapor from said at least one of said evaporators in step (b) and said suction of said compressor or compressor rack; and (d) establishing a new first refrigeration circuit comprising said compressor or compressor rack and said condenser, wherein said existing refrigerant is removed and replaced with a new first refrigerant different than said existing refrigerant;

(e) establishing a new second refrigeration circuit comprising said at least one of said evaporators, and preferably all of said evaporators, that has been disconnected in steps (b) and (c) by steps comprising: (i) removing said existing refrigerant from said evaporators and at least a portion of said conduits which have been disconnected in steps (b) and (c); and (ii) replacing said removed existing refrigerant with a second refrigerant consisting essentially of: (1) 50%±1% by weight of CF3I; (2) about 34.5%±1% by weight of HFO-1234yf; (3) 14%±1% % by weight of HFC-32; and (4) 1.5%+0.2% by weight of HFC-125, wherein said second refrigerant: (i) has an Occupational Exposure Limit (OEL) greater than 400; (ii) is classified as class A1 by ASHRAE Standard 34; and (iii) has a GWP of less than about 150; and (f) thermally interconnecting said new first refrigeration circuit and said new second refrigeration circuit with a new inter-circuit heat exchanger in which at least a portion of said refrigerant is said first circuit is vaporized by absorbing heat from said second circuit refrigerant vapor and wherein at least a portion of said second refrigerant vapor is condensed by transferring heat to said first circuit liquid.

For the purposes of convenience, compositions according to the present paragraph are referred to herein as System Forming Method 12B.

The present invention also includes methods for forming an improved refrigeration system, preferably large-capacity centralized refrigeration system comprising:

(a) providing an existing refrigeration circuit comprising: (i) an existing refrigerant having a GWP of greater than 1200; (ii) a plurality of evaporators located in or near a refrigerated space containing products accessible to consumers and (iii) at least one compressor or rack of compressors and at least one condenser located remotely from said areas accessible to said consumers, wherein said existing refrigerant liquid from said condenser is fluidly connected to said evaporators via conduit(s) and wherein existing refrigerant vapor from said evaporators is returned via conduits to the suction side of said compressor or compressor rack;

(b) disconnecting the fluid connection between said existing liquid refrigerant from said condenser and at least one of said evaporators, preferably substantially all of said evaporators;

(c) disconnecting the fluid connection between said existing refrigerant vapor from said at least one of said evaporators in step (b) and said suction of said compressor or compressor rack; and (d) establishing a new first refrigeration circuit comprising said compressor or compressor rack and said condenser, wherein said existing refrigerant is removed and replaced with a new first refrigerant different than said existing refrigerant;

(e) establishing a new second refrigeration circuit comprising said at least one of said evaporators, and preferably all of said evaporators, that has been disconnected in steps (b) and (c) by steps comprising: (i) removing said existing refrigerant from said evaporators and at least a portion of said conduits which have been disconnected in steps (b) and (c); and (ii) replacing said removed existing refrigerant with a second refrigerant consisting of: (1) 50%±1% by weight of CF3I; (2) about 34.5%±1% by weight of HFO-1234yf; (3) 14%±1% % by weight of HFC-32; and (4) 1.5%±0.2% by weight of HFC-125, wherein said second refrigerant: (i) has an Occupational Exposure Limit (OEL) greater than 40; (ii) is classified as class A1 by ASHRAE Standard 34; and (iii) has a GWP of less than about 150; and (f) thermally interconnecting said new first refrigeration circuit and said new second refrigeration circuit with a new inter-circuit heat exchanger in which at least a portion of said refrigerant is said first circuit is vaporized by absorbing heat from said second circuit refrigerant vapor and wherein at least a portion of said second refrigerant vapor is condensed by transferring heat to said first circuit liquid.

For the purposes of convenience, compositions according to the present paragraph are referred to herein as System Forming Method 12C.

The present invention also includes methods for forming an improved refrigeration system, preferably large-capacity centralized refrigeration system comprising:

(a) providing an existing refrigeration circuit comprising: (i) an existing refrigerant having a GWP of greater than 1200; (ii) a plurality of evaporators located in or near a refrigerated space containing products accessible to consumers and (ii) at least one compressor or rack of compressors and at least one condenser located remotely from said areas accessible to said consumers, wherein said existing refrigerant liquid from said condenser is fluidly connected to said evaporators via conduit(s) and wherein existing refrigerant vapor from said evaporators is returned via conduits to the suction side of said compressor or compressor rack;

(b) disconnecting the fluid connection between said existing liquid refrigerant from said condenser and at least one of said evaporators, preferably substantially all of said evaporators;

(c) disconnecting the fluid connection between said existing refrigerant vapor from said at least one of said evaporators in step (b) and said suction of said compressor or compressor rack; and (d) establishing a new first refrigeration circuit comprising said compressor or compressor rack and said condenser, wherein said existing refrigerant is removed and replaced with a new first refrigerant different than said existing refrigerant;

(e) establishing a new second refrigeration circuit comprising said at least one of said evaporators, and preferably all of said evaporators, that has been disconnected in steps (b) and (c) by steps comprising: (i) removing said existing refrigerant from said evaporators and at least a portion of said conduits which have been disconnected in steps (b) and (c); (ii) replacing said removed existing refrigerant with a second refrigerant consisting of: (1) 40% to 50% by weight of CF3I;

(2) from 35% to 45% by weight of HFO-1234yf; (3) from 10% to 16% by weight of HFC-32; and (4) 1.5% to 2.5% by weight of CO2, wherein said second refrigerant: (i) has an Occupational Exposure Limit (OEL) greater than 40; (ii) is classified as class A1 by ASHRAE Standard 34; and (iii) has a GWP of less than about 150; and (f) thermally interconnecting said new first refrigeration circuit and said new second refrigeration circuit with a new inter-circuit heat exchanger in which at least a portion of said refrigerant is said first circuit is vaporized by absorbing heat from said second circuit refrigerant vapor and wherein at least a portion of said second refrigerant vapor is condensed by transferring heat to said first circuit liquid.

For the purposes of convenience, compositions according to the present paragraph are referred to herein as System Forming Method 13.

DETAILED DESCRIPTION

Definitions

Figure 1:
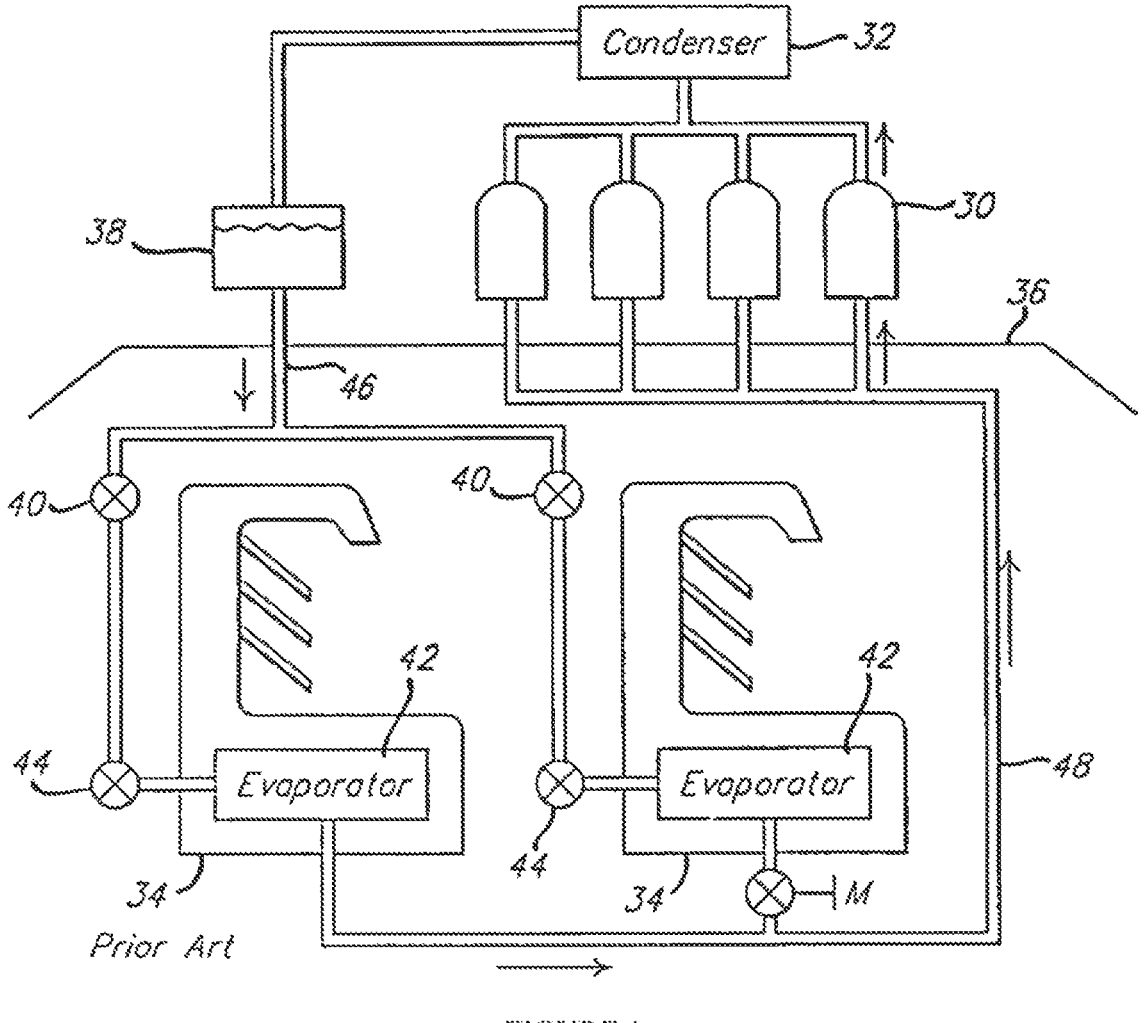
FIG. 1 is a semi-schematic process flow diagram showing a centralized refrigeration system according to the prior art.

For the purposes of this invention, the term "about" in relation to the amounts expressed in weight percent for amounts greater than 2% means that the amount of the component can vary by an amount of +/−2% by weight.

For the purposes of this invention, the term "about" in relation to temperatures in degrees centigrade (° C.) means that the stated temperature can vary by an amount of +/−5° C.

For the purposes of this invention, the term "about" in relation to percentage of power usage means that the stated percentage can vary by an amount of up to 1%.

For the purposes of this invention, the term "substantial portion" in relation to removal of an existing refrigerant from a heat transfer system means removing at least about 50% of the existing refrigerant contained in the system.

The term "capacity" is the amount of cooling provided, in BTUs/hr. or kW, by the refrigerant in the refrigeration system. This is experimentally determined by multiplying the change in enthalpy in BTU/lb., or kJ/kg, of the refrigerant as it passes through the evaporator by the mass flow rate of the refrigerant. The enthalpy can be determined from the measurement of the pressure and temperature of the refrigerant. The capacity of the refrigeration system relates to the ability to maintain an area to be cooled at a specific temperature. The capacity of a refrigerant represents the amount of cooling or heating that it provides and provides some measure of the capability of a compressor to pump quantities of heat for a given volumetric flow rate of refrigerant. In other words, given a specific compressor, a refrigerant with a higher capacity will deliver more cooling or heating power.

The phrase "coefficient of performance" (hereinafter "COP") is a universally accepted measure of refrigerant performance, especially useful in representing the relative thermodynamic efficiency of a refrigerant in a specific heating or cooling cycle involving evaporation or condensation of the refrigerant. In refrigeration engineering, this term expresses the ratio of useful refrigeration or cooling capacity to the energy applied by the compressor in compressing the vapor and therefore expresses the capability of a given compressor to pump quantities of heat for a given volumetric flow rate of a heat transfer fluid, such as a refrigerant. In other words, given a specific compressor, a refrigerant with a higher COP will deliver more cooling or heating power. One means for estimating COP of a refrigerant at specific operating conditions is from the thermodynamic properties of the refrigerant using standard refrigeration cycle analysis techniques (see for example, R. C. Downing, FLUOROCARBON REFRIGERANTS HANDBOOK, Chapter 3, Prentice-Hall, 1988 which is incorporated herein by reference in its entirety).

The phrase "discharge temperature" refers to the temperature of the refrigerant at the outlet of the compressor. The advantage of a low discharge temperature is that it permits the use of existing equipment without activation of the thermal protection aspects of the system which are preferably designed to protect compressor components and avoids the use of costly controls such as liquid injection to reduce discharge temperature.

The term "centralized refrigeration system" as used herein means a refrigeration system that includes one or more centrally located compressors or rack of compressors and one or more centrally located condensers, and a plurality of evaporators located remotely from said centralized compressor or rack of compressors and which receive liquid refrigerant from said centrally located condenser(s).

"Direct Expansion" as used herein means heat transfer systems which utilize evaporators in which the liquid refrigerant enters the evaporator and flows through coils (preferably tubular coils) and vaporizes as heat is absorbed from air circulating in the display case, and which uses a thermostatic expansion valve at the inlet of the evaporator and which is controlled to feed enough refrigerant to result in substantially all of the refrigerant being evaporated at the evaporator outlet and to optionally have a predetermined amount of super heat at the exit.

The phrase "Global Warming Potential" (hereinafter "GWP") was developed to allow comparisons of the global warming impact of different gases, and as used herein refers to GWP as determine by AR5 as describe above. Specifically, it is a measure of how much energy the emission of one ton of a gas will absorb over a given period of time, relative to the emission of one ton of carbon dioxide. The higher the GWP, the more that a given gas warms the Earth compared to CO2 over that time period. The time period usually used for GWP is 100 years. GWP provides a common measure, which allows analysts to add up emission estimates of different gases. See http://www.protocolode-montreal.org.br/site/images/publicacoes/setor_manufatura_equip amentos_refrigeracao_arcondicionado/Como_calcular_el_Potencial_de_Calentamiento_Atmosferico_en_las-_mezclas_de_refrigerantes.pdf The term "Occupational Exposure Limit (OEL)" is determined in accordance with ASHRAE Standard 34-2016 Designation and Safety Classification of Refrigerants.

The phrase "acceptable toxicity" as used herein means the composition is classified as class "A" by ASHRAE Standard 34-2016 Designation and Safety Classification of Refrigerants and described in Appendix B1 to ASHRAE Standard 34-2016 (as each standard exists as of the filing date of this application). A substance which is non-flammable and low toxicity would be classified as "A1" by ASHRAE Standard 34-2016 Designation and Safety Classification of Refrigerants and described in Appendix B1 to ASHRAE Standard 34-2016 (as each standard exists as of the filing date of this application).

The term "mass flow rate" is the mass of refrigerant passing through a conduit per unit of time.

As used herein, the term "replacement" means the use of a composition of the present invention in a heat transfer system that had been designed for use with or is suitable for use with another refrigerant. By way of example, when a refrigerant or heat transfer composition of the present invention is used in a heat transfer system that was designed for use with R-410A, then the refrigerant or heat transfer composition of the present invention is a replacement for R-410A in said system. It will thus be understood that the term "replacement" includes the use of the refrigerants and heat transfer compositions of the present invention in both new and existing systems that had been designed for use with, are commonly used with, or are suitable for use with R-410A.

The term "glide" applies to zeotropic refrigerant mixtures that have varying temperatures during phase change processes in the evaporator or condenser at constant pressure and are quantified herein as the difference between the saturated vapor temperature and the saturated liquid temperature at pressure of 100 kPa.

The term "low temperature refrigeration system" refers to heat transfer systems which operate with a condensing temperature of from about 40° C. to about 70° C. and evaporating temperature of from about −45° C. up to and including −12° C.

The term "medium temperature refrigeration system" refers to heat transfer systems which operate with a condensing temperature of from about 40° C. to about 70° C. and evaporating temperature of from −12° C. to about 0° C.

The term "supermarket refrigeration" as used herein refers to commercial refrigeration systems that are used to maintain chilled or frozen food in both product display cases and storage refrigerators.

The term "normal boiling point" refers to the boiling point of a single component measured at 1 atmosphere of pressure and refers to the initial boiling point of a blend of components at 1 atmosphere.

The term "R-22" means chlorodifluoromethane.

The terms "HFC-32" and "R-32" as used herein each mean difluoromethane.

The term "R-125" means pentafluoroethane.

The term "R-134a" means 1,1,1,2-tetrafluoroethane.

The term "R-143a" means 1,1,1-trifluoroethane.

The term "R-404A" means a combination of about 44% by weight of R-125, about 52% by weight of R-143a and about 4% by weight of R-134a.

The term "R-407A" means a combination of about 20% by weight of R-32, about 40% by weight of R-125, and about 40% by weight of R-134a.

The term "R-407F" means a combination of about 23% by weight of R-32, about 25% by weight of R-125, and about 52% by weight of R-134a.

The term "R-407H" means a combination of 32.5%+/–1% by weight of R-32, 15%+/–1% by weight of R-125, and about 52.5%+/–2% by weight of R-134a.

The term "R-448A" means a combination of about 26% by weight of R-32, about 26% by weight of R-125, and about 21% by weight of R-134a.

The term "R-449A" means a combination of about 24.3% by weight of R-32, about 24.7% by weight of R-125, and about 25.7% by weight of R-134a.

The terms "HFO-1234yf" and "R-1234yf" as used herein each mean 2,3,3,3-tetrafluoropropene.

The terms "HFO-1234ze(E)," R-1234ze(E) and "1234ze (E)" as used herein each mean trans-1,3,3,3-tetrafluoropropene.

Reference herein to a group of defined items includes all such defined items, including all such items with suffix designations.

Systems and Methods

The methods of the present invention generally comprise a first step of providing an existing centralized refrigeration system. A schematic example of such a centralized refrigeration system is illustrated in FIG. 1, which shows a system that includes a rack of compressors 30, a condenser 32, an accumulator 38 and a series of display cases 34, each containing an evaporator 42. A high GWP refrigerant, such as R-404a, circulates in such system through a network of piping 46 carrying liquid refrigerant and a network of piping 48 carrying refrigerant vapor. Although shown schematically in FIG. 1, in practice each of these piping networks generally represents an extensive and long series of conduits for transporting the liquid refrigerant from the accumulator 38, which is generally placed, along with the compressor rack 30 and the condenser 32, at a location that is remote from the display cases. Thus, the piping network 46 is large, covering the distance from, for example, the roof or machine room of a supermarket to spreading over the supermarket floor to reach the multitude of display cases located there. While FIG. 1 shows just two (2) display cases, those skilled in the art will appreciate that in many circumstances from 1 up to about 150 display cases per circuit distributed over a large consumer retail area that needs to be reached by the liquid piping network 46, and an equally large vapor return piping network 48 would be required to return the refrigerant vapor in each of those cases to the rooftop or machine room. In many applications, the length of piping needed for the liquid feed from and vapor return to the compressor is at least about 20 meters (65 feet).

It will also be appreciated by those skilled in the art that while the compressor rack in FIG. 1 is depicted as having four compressors 30, in practice the compressor rack can comprise from one (1) compressor up to about 5 compressors, depending on individual applications. Put another way, the existing refrigerant systems that are provided according to the present invention can represent a compressor work capacity of from about 3 kW to about 500 kW. With respect to the type of compressor, it is contemplated that all types of compressors can be present in such systems, but in many of such systems the compressors which are used are selected from screw compressors, scroll compressors, reciprocating compressors, centrifugal compressors, dual screw compressors and combinations of these.

The existing refrigerants that are used in the existing centralized refrigeration systems of the present invention generally have a GWP of 1200 or greater (determined according to AR5), and include R404A, R22 and R407 (including each of R407A, R407B, R407C, R407D and R407F), R448 (all letter designations, including R448A) and R449 (all letter designations, including R449A). In this application reference to a refrigerant by letter designation without a suffix (such as R448) is intended to refer individually each refrigerant the has that designation, including all suffixed refrigerants. Thus, for example, reference to "R448" is intended to reference individually each of R448A and R448B.

Figure 2:
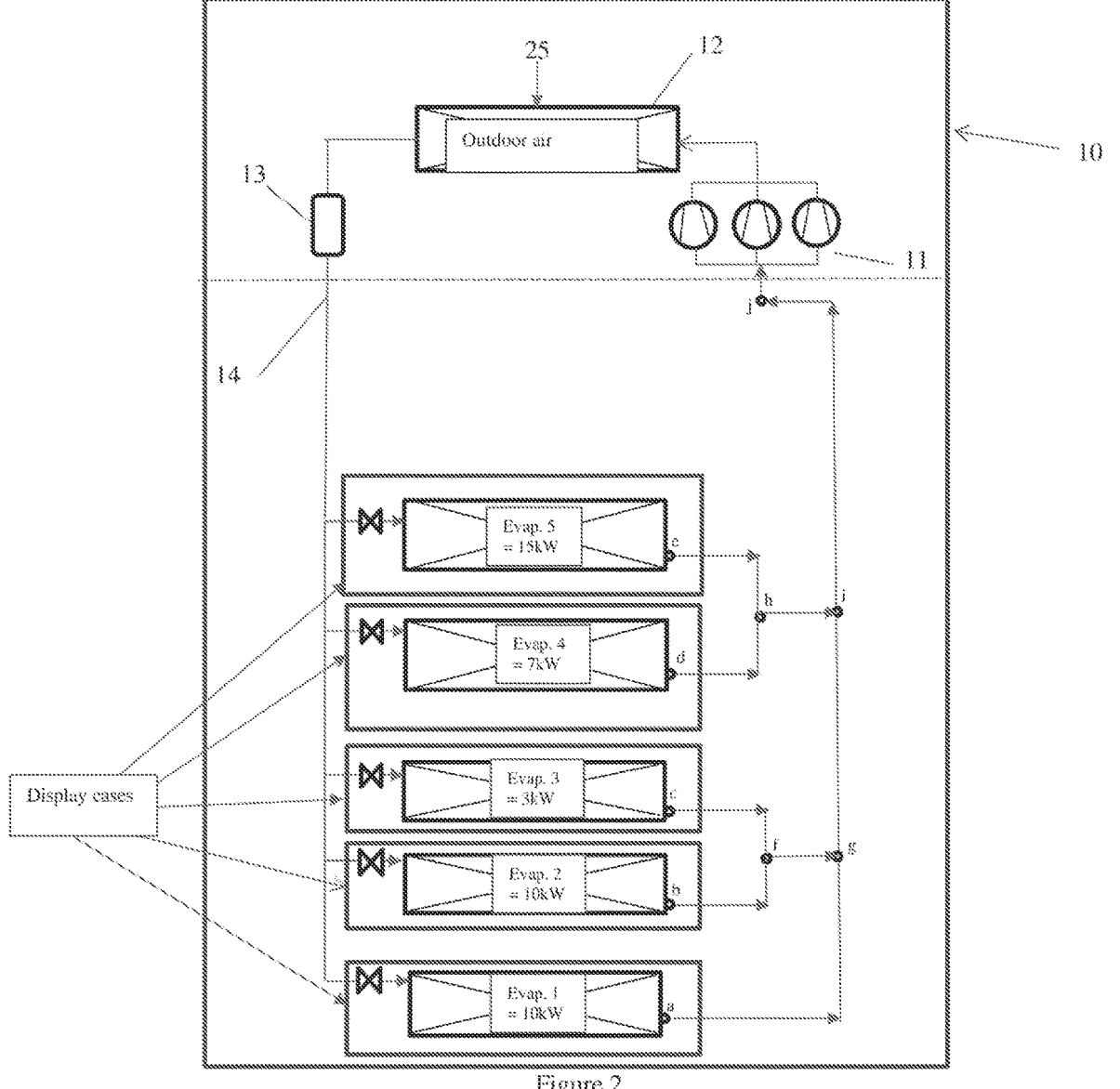
FIG. 2 is semi-schematic representation of an exemplary starting centralized refrigeration system used in the heat transfer system formation methods of the present invention.
Figure 3A:
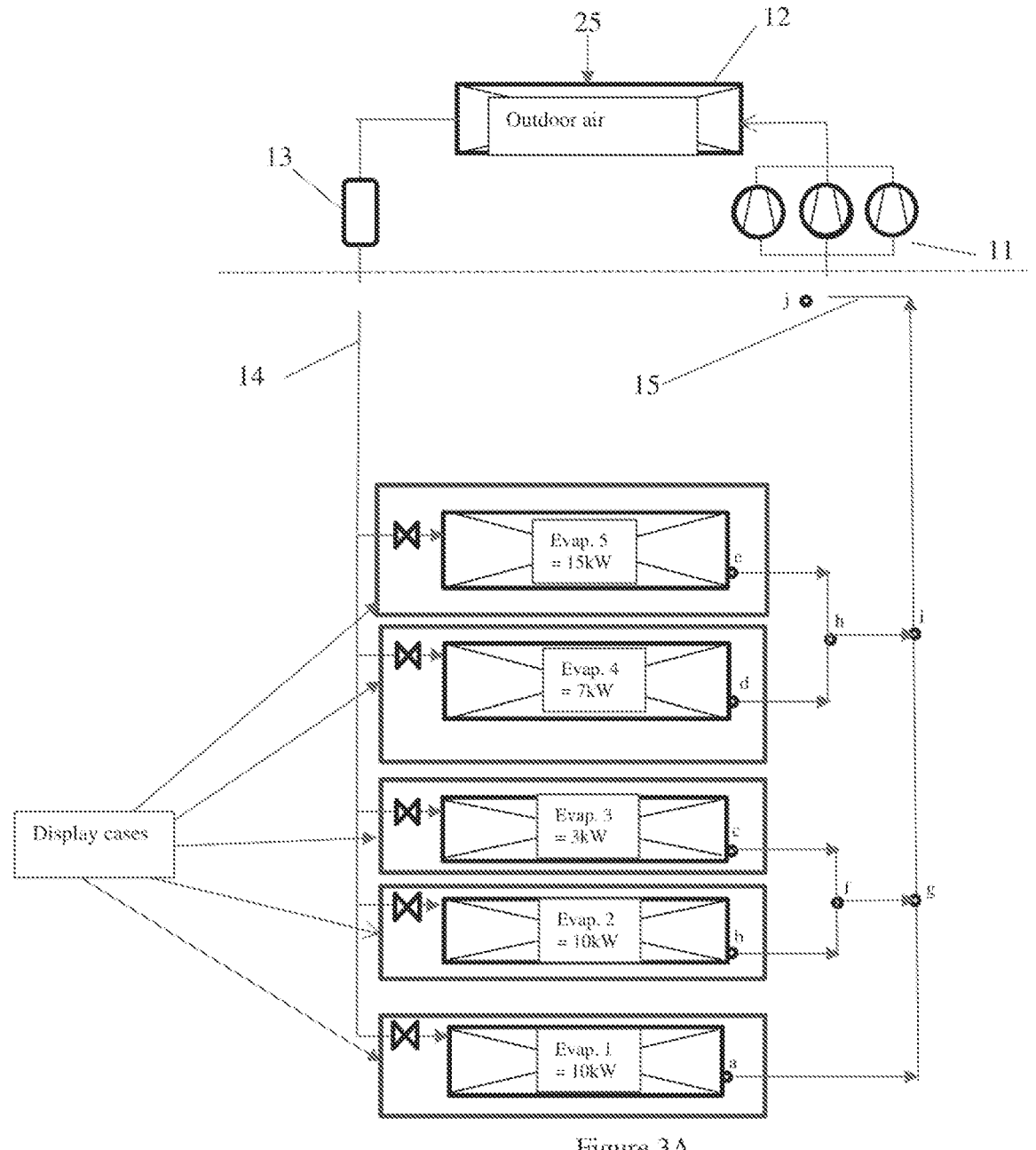
FIG. 3A is a schematic representation of an exemplary starting centralized refrigeration system showing disconnection points in the process of forming a heat transfer system of the present invention.

The present invention involves improving systems of the type disclosed in FIG. 1 to improve the environmental friendliness of the system. The preferred methods include the steps of disconnecting the liquid connection between the condenser and at least one of, and preferably all of the evaporators, and also disconnecting the vapor connection between the evaporators and suction of the compressor(s). With reference, for example to FIGS. 2A, 2B and 2C, the liquid line 14 is disconnect, preferably just downstream of the accumulator 13 so as to separate the liquid side of the evaporators from the liquid from the condenser 12, and the vapor line 15 is disconnected, preferably just upstream of the compressor(s) so as to separate the vapor side of the evaporator(s) from the compressor(s). This disconnecting step thus enables the conversion of the existing single refrigeration circuit to a new first refrigeration circuit and new second refrigeration circuit (see for example 10A and 101B, respectively, in FIG. 3C). As used herein in this context, the term "new" is understood to mean only that the circuits that are defined by the present invention did not previously exist, but it will be understood that one objective of the present invention is to utilize a large proportion of the "old" piping network and the "old" evaporator(s) as part of the new second refrigeration circuit. In certain preferred embodiments, it is also an object to use the "old" compressor(s), condenser and accumulator and the piping and valving therebetween to form the second new refrigeration circuit.

Either prior to, simultaneous with or after the disconnecting step, the existing refrigerant is removed from the liquid and vapor piping network that remains connected to the evaporators, as well as the evaporators themselves and all other piping, valving, and the like that will be used to form the new second refrigeration circuit, such as circuit 10B in FIG. 3C. The preferred second circuit, an example of which is shown in FIG. 3C, is formed by including a liquid pump 21, which in preferred embodiments is fed with cool, liquid refrigerant by an accumulator 22. The pump provides the motive force to transport the second refrigerant to each of the evaporators that have been disconnected from the compressor. The liquid refrigerant in the second circuit 10B provides cooling to the display cases as it is vaporized in the evaporator by absorbing heat from the air and/or products in the display cases.

An important aspect of the present invention is that the vapor from the evaporators is not returned to the compressor(s), as would have been the case with the original system, but instead the present invention involves the step of thermally interconnecting the new first refrigeration circuit 10A and said new second refrigeration circuit 10B with a new inter-circuit heat exchanger 20. The vapor from the evaporators travels to this inter-circuit heat exchanger in which at least a portion of said second refrigerant is condensed by transferring heat to the liquid refrigerant leaving the condenser in the new first circuit and thereby vaporizing the first refrigerant and producing refrigerant to feed the compressor 11 of the first circuit. In this arrangement, the inter-circuit heat exchanger acts as an evaporator in said first circuit and as a condenser in said second circuit.

Importantly, the present methods involve using in said new second circuit a low GWP refrigerant which has a GWP of 150 or less and which also preferably is a Class 1A refrigerant with an OEL greater than 400 and has a normal. The following Table A identifies three refrigerant blends A1, A2 and A3 that satisfy these criteria and provide substantial an unexpected advantage in accordance with the present invention, it being understood that the amounts in the table are considered to all be preceded by "about":

TABLE A

|  | Refrigerant | | | | |
| --- | --- | --- | --- | --- | --- |
|  | A1 | A2 | A3 | A4 | A5 |
| Component | Concentration, wt. % | | | | |
| CF3I | 69.5 | 59 | 38 | 50 | 45 |
| HFO-1234yf | 9 | 19.5 | 54 | 34.5 | 40 |
| HFC-32 | 21.5 | 21.5 | 5 | 14 | 13 |
| HFC-125 | 0 | 0 | 3 | 1.5 | 0 |
| $CO_2$ | 0 | 0 | 0 | 0 | 2 |
| Total | 100 | 100 | 100 | 100 | 100 |
| ASHRAE Name | — | — | — | — | — |
| Properties |  |  |  |  |  |
| Full Glide, ° C. | 11.8 | 10 | 7 | 10 | 14.1 |
| GWP (as per AR4) | 145.8 | 146.1 | 141.1 | 148.6 | 89.6 |

It is contemplated that the existing refrigerant that is contained in the piping and equipment associated with the condenser and compressors (i.e., the new first refrigeration circuit) can remain and be used as the refrigerant for the new first circuit, however it is generally preferred that the existing refrigerant be removed from the compressor/condenser circuit and replaced with a new, preferably lower GWP refrigerant. In those embodiments in which the existing refrigerant in the new first circuit remains, it is contemplated that the existing equipment, including the compressor(s), condenser(s), accumulators, connective piping, and the like will also not need to be replaced. Such embodiments have the advantage of minimizing incremental capital equipment cost but will result in a high GWP refrigerant being utilized in the new second circuit. While such an arrangement has a significant environmental advantage because the amount of high GWP refrigerant being used in converted system is greatly reduced compared to the original system, in another, generally preferred embodiment the existing refrigerant is removed from the compressor(s), condenser(s), accumulators, connective piping and the like, and a new low GWP refrigerant is used to replace all or substantially all of the existing refrigerant. In such embodiments it is likely that one or more, or all, of those pieces of the system will need to be replaced and/or modified, which in turn increases capital expenditures. However, proceeding according to the embodiments in which the high GWP refrigerant is removed from the first circuit provides the most desirable result from an environmental standpoint since it provides a converted system in which only low GWP refrigerant is used. In general, for such embodiments, the new refrigerant for the first circuit will have a GWP of less than 150, more preferably less than 100 and even more preferably less than about 25.

For cases in which the existing refrigerant is R404A, R407, R507 or R22, which all have a GWP greater than 1500, the refrigerant used to replace such refrigerants are preferably selected in accordance with the Table below labeled as Case 1:

CASE 1

Embodiments of the Invention

| Existing Refrigerant | Case No. | Replacement Refrigerant in Condenser (Primary) Circuit | Refrigerant in the Evaporator (Secondary) Circuit |
| --- | --- | --- | --- |
| R404A | 1A | R448A | A1 |
| R404A | 1B | R448A | A2 |
| R404A | 1C | R448A | A3 |
| R404A | 1D | R448A | A4 |
| R404A | 1E | R448A | A5 |
| R404A | 1F | R449A | A1 |
| R404A | 1G | R449A | A2 |
| R404A | 1H | R449A | A3 |
| R404A | 1I | R449A | A4 |
| R404A | 1J | R449A | A5 |
| R407A | 1K | R448A | A1 |
| R407A | 1L | R448A | A2 |
| R407A | 1M | R448A | A3 |
| R407A | 1N | R448A | A4 |
| R407A | 1O | R448A | A5 |
| R407A | 1P | R449A | A1 |
| R407A | 1Q | R449A | A2 |
| R407A | 1R | R449A | A3 |
| R407A | 1S | R449A | A4 |
| R407A | 1T | R449A | A5 |
| R407C | 1U | R448A | A1 |
| R407C | 1V | R448A | A2 |
| R407C | 1W | R448A | A3 |
| R407C | 1X | R448A | A4 |
| R407C | 1Y | R448A | A5 |
| R407C | 1Z | R449A | A1 |
| R407C | 1AA | R449A | A2 |
| R407C | 1AB | R449A | A3 |
| R407C | 1AC | R449A | A4 |
| R407C | 1AD | R449A | A5 |
| R507A | 1AE | R448A | A1 |
| R507A | 1AF | R448A | A2 |
| R507A | 1AG | R448A | A3 |
| R507A | 1AH | R448A | A4 |
| R507A | 1AI | R448A | A5 |
| R22 | 1AJ | R448A | A1 |
| R22 | 1AK | R448A | A2 |
| R22 | 1AL | R448A | A3 |
| R22 | 1AM | R448A | A4 |
| R22 | 1AN | R448A | A5 |
| R407H | 1AO | R448A | A1 |
| R407H | 1AP | R448A | A2 |
| R407H | 1AQ | R448A | A3 |
| R407H | 1AR | R448A | A4 |
| R407H | 1AS | R448A | A5 |
| R407H | 1AT | R449A | A1 |
| R407H | 1AU | R449A | A2 |
| R407H | 1AV | R449A | A3 |
| R407H | 1AW | R449A | A4 |
| R407H | 1AX | R449A | A5 |

In other cases the existing refrigerant is R448 (having a GWP of less than about 1200) or R449 (having a GWP of less than about 1500), and in such cases the existing refrigerant is not replaced, preferably in accordance with the Table below labeled as Case 2.

CASE 2

Embodiments of the Invention

| Existing Refrigerant | Case No. | Replacement Refrigerant in Condenser (Primary) Circuit | Refrigerant in the Evaporator (Secondary) Circuit |
| --- | --- | --- | --- |
| R448 | 2A | Not Replaced | A1 |
| R448 | 2B | Not Replaced | A2 |

-continued

| CASE 2 | | | |
| --- | --- | --- | --- |
| | | Embodiments of the Invention | |
| Existing Refrigerant | Case No. | Replacement Refrigerant in Condenser (Primary) Circuit | Refrigerant in the Evaporator (Secondary) Circuit |
| R448 | 2C | Not Replaced | A3 |
| R448 | 2D | Not Replaced | A4 |
| R448 | 2E | Not Replaced | A5 |
| R449 | 2F | Not Replaced | A1 |
| R449 | 2G | Not Replaced | A2 |
| R449 | 2H | Not Replaced | A3 |
| R449 | 2I | Not Replaced | A4 |
| R449 | 2J | Not Replaced | A5 |

Other examples of low GWP refrigerants to use in the new first refrigerant circuit in embodiments in which the existing refrigerant has a GWP of greater than 1500, such as R404A, R407, R507 or R22, include 1234ze(E) 1234yf and blends containing these.

As will be appreciated by those skilled in the art, the present invention includes methods which combined a wide scope of existing systems having existing refrigerants and a variety of specific refrigerants that may be used in the new second circuit and the optionally as a replacement for the existing refrigerant in the new first circuit.

EXAMPLES

The following examples are provided for the purpose of illustrating the present invention but without limiting the scope thereof.

For the evaluation of possible methods to improve an existing centralized refrigeration system to be more environmentally friendly, including for comparison purposes by essentially removing the entire charge of the existing high GWP refrigerant and replacing it with a lower GWP refrigerant, it is important to consider performance parameters.

Comparative Example C1—Refrigeration System Using R-404A as Refrigerant in a Medium Temperature Application A direct expansion refrigeration system having a capacity of about 100 kW of the type disclosed in FIG. 1 is provided with R-404A as the existing refrigerant. The system operating conditions using R-404A as the refrigerant in the system of FIG. 1 are:

Cooling capacity: 100 kW

Isentropic efficiency: 65%

Volumetric efficiency: 100%

Condensing temperature: 45° C.

Subcooling: 0° C. (system with receiver)

Evaporator Superheat: 5.5° C.

Temperature rise in suction line: 10° C.

Evaporating temperature: −8° C.

While this system operates well from the standpoint of thermodynamic and heat transfer performance, it is highly undesirable from the standpoint of its environmental impact since the entire system contains the high GWP refrigerant R404A circulating throughout the entirety of a large and complex piping network.

Example 1A—Formation of a Centralized Refrigeration by Modifying Original System Using R-404A and Replacing R404A in New Primary Loop with R448A and in New Secondary Loop with Refrigerants A1-A5

The heat transfer system of Comparative Example C1, including the existing refrigerant R404A contained therein, is used as the starting point for the formation of an improved heat transfer system. Modification of the system is described first in connection with FIG. 3A. The portion of the system containing the condenser 12A (and the optional the free cooling condenser 12 shown in FIG. 3B), the compressor rack 11 and the accumulator 13, each of which is located outdoors or in a machine room (above dotted line 100A in FIG. 3B), is each disconnected from the display cases, preferably close to where the compressor rack and accumulator are located, for example by cutting the liquid line 14 leading from the accumulator and by cutting the vapor riser 15 leading to the compressor rack. While the present invention includes embodiments in which the existing refrigerant R404A located in this portion of the system is not removed, in the preferred embodiment of this example the existing refrigerant R404A is removed from this portion of the system (above the dotted line 100A, i.e., indicating an outdoor or machine room location) and is replaced with R448A and the R404A located in the remainder of the system (below the dotted line, indicating an outdoor or machine room location) is removed from all of the remaining refrigerant conduits and all the evaporators and is replaced with a refrigerant of the present invention.

Figure 3B:
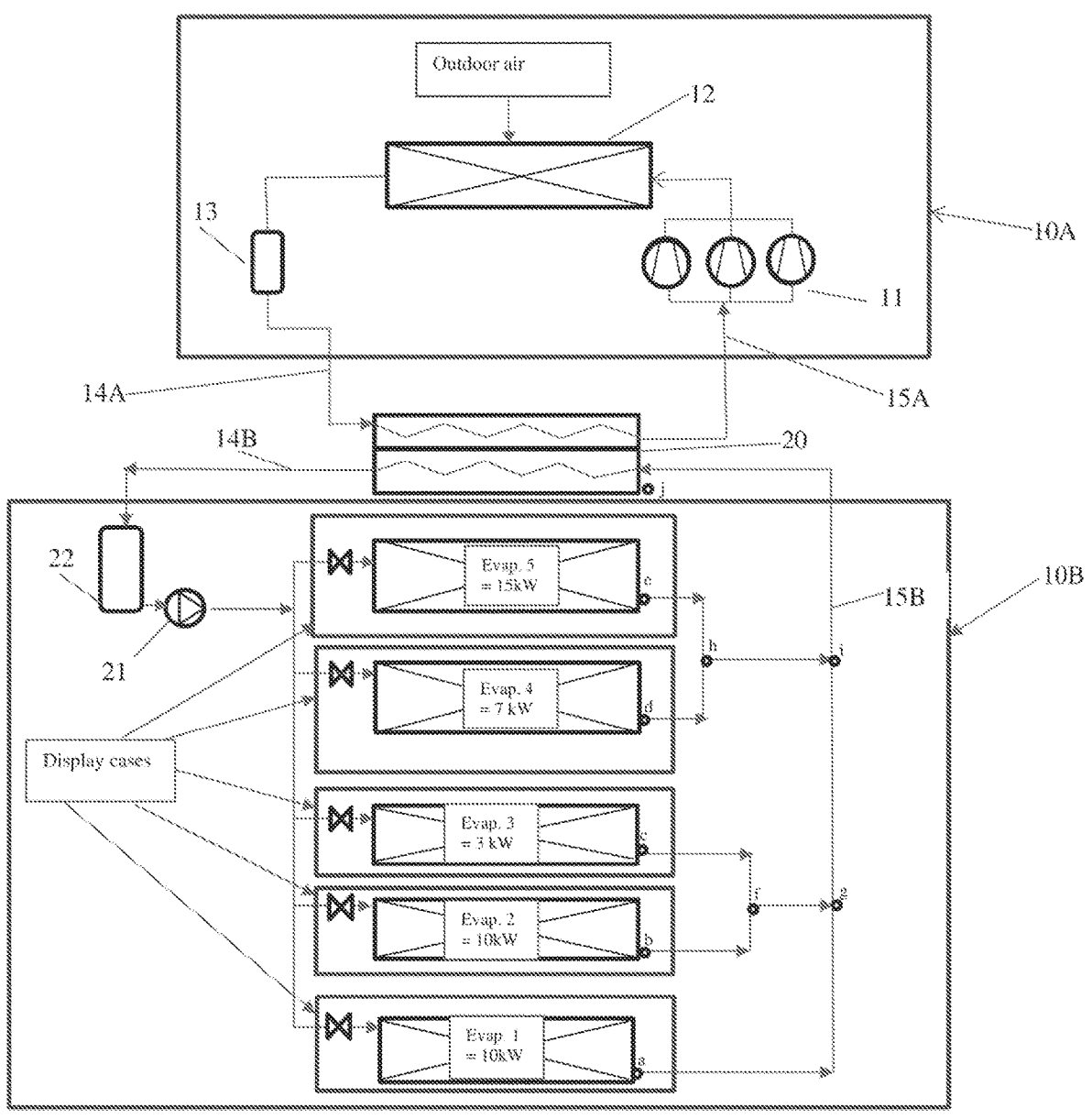
FIG. 3B is a schematic representation of a completed exemplary centralized refrigeration system made in accordance with heat transfer system forming methods of the present invention.

As shown in FIG. 3B, the system is then reconfigured as a first heat transfer system 10A using the R448A and a second heat transfer circuit 10B which comprises the evaporators 1-5 and which uses each of new low GWP refrigerants A1-A5 according to the present invention. A new heat exchanger 20 thermally interconnects the first heat transfer circuit 10A to the second heat transfer circuit 10B by transporting the liquid R448A refrigerant from the accumulator, preferably over a relatively short distance in conduit 14A, to inter-circuit heat exchanger 20, where is absorbs heat from the new refrigerant in the second circuit and is evaporated. The evaporated R-448A is then returned to the suction side of the compressor rack via conduit 15A, which preferably also extends over a relatively short distance.

A liquid pump 21 is added to the second circuit system to provide the motive force to deliver the low GWP refrigerant (A1-A5) to each of the evaporators via respective conduits and valves. In each evaporator the refrigerant according to the present invention provides cooling to its respective display case as it evaporates in thermal contact with the relatively warmer air in the display case. The refrigerant vapor according to the present invention exiting from the evaporators 1-5 is then manifolded to riser 15B, where it is transported to the inter-circuit heat exchanger 20 and where it rejects heat to the liquid R-448A (or optionally in part to the free cooling condenser (note appropriate valving to achieve this optional operation is provided but not shown) from the first circuit and in so doing condenses back to liquid. Liquid refrigerant according to the present invention from the heat exchanger 20 travels via conduit 14B to accumulator 22, which in turn provides a source of liquid according to the present invention to pump 21.

The refrigerant according to the present invention evaporates (partially or completely) in each evaporator and the return flow of refrigerant vapor through riser 15B is at saturated or superheated state.

The following Table E1A demonstrates that excellent performance is achieved according to the systems and methods of the present invention as exemplified in this Example 1A, with results being reported relative to the base system of Comparative Example C1 with R404A as the sole refrigerant in the described centralized refrigeration system:

TABLE E1A

| | | | Capacity, % Compared to R404A Base | COP, % Compared to R404A Base |
|---|---|---|---|---|
| Case No. | Primary Refrigerant | Secondary Refrigerant | | |
| 1A | 448A | A1 | 99 | 103 |
| 1B | 448A | A2 | 99 | 103 |
| 1C | 448A | A3 | 100 | 104 |
| 1D | 448A | A4 | 99 | 103 |
| 1E | 448A | A5 | 99 | 103 |

Medium Temperature Performance - Case 1A-1E

Example 1B—Formation of a Centralized Refrigeration by Modifying Original System Using Existing Refrigerant R-404A and Replacing R404A in New Primary Loop with R449A and in New Secondary Loop with Refrigerants A1-A5

Example A is repeated except that the new primary loop contains R449A. The following Table E1B demonstrates that excellent performance is achieved according to the systems and methods of the present invention as exemplified in this Example 1B, with results being reported relative to the base system of Comparative Example C1 with R404A as the sole refrigerant in the described centralized refrigeration system:

TABLE E1B

| | | | Capacity, % Compared to R404A Base | COP, % Compared to R404A Base |
|---|---|---|---|---|
| Case No. | Primary Refrigerant | Secondary Refrigerant | | |
| 1F | 449A | A1 | 97 | 103 |
| 1G | 449A | A2 | 98 | 103 |
| 1H | 449A | A3 | 99 | 104 |
| 1I | 449A | A4 | 98 | 103 |
| 1J | 449A | A5 | 97 | 102 |

Medium Temperature Performance - Case 1F-1J

Example 2A—Formation of a Centralized Refrigeration by Modifying Original System Using Existing Refrigerant R-407A and Replacing R407A in New Primary Loop with R448A and in New Secondary Loop with Refrigerants A1-A5

Example 1A is repeated except that the existing refrigerant is R407A. The following Table E2A demonstrates that excellent performance is achieved according to the systems and methods of the present invention as exemplified in this Example 2A, with results being reported relative to the base system of Comparative Example C1 with R407A as the sole refrigerant in the described centralized refrigeration system:

TABLE E2A

| | | | Capacity, % Compared to R404A Base | COP, % Compared to R404A Base |
|---|---|---|---|---|
| Case No. | Primary Refrigerant | Secondary Refrigerant | | |
| 1K | 448A | A1 | 94 | 94 |
| 1L | 448A | A2 | 94 | 94 |
| 1M | 448A | A3 | 96 | 95 |
| 1N | 448A | A4 | 94 | 94 |
| 1O | 448A | A5 | 93 | 94 |

Medium Temperature Performance - Case 1K-1O

Example 2B—Formation of a Centralized Refrigeration by Modifying Original System Using Existing Refrigerant R-407A and Replacing R407A in New Primary Loop with R449A and in New Secondary Loop with Refrigerants A1-A5

Example 1B is repeated except that the existing refrigerant is R407A. The following Table E2B demonstrates that excellent performance is achieved according to the systems and methods of the present invention as exemplified in this Example 2B, with results being reported relative to the base system of Comparative Example C1 with R407A as the sole refrigerant in the described centralized refrigeration system:

TABLE E2B

| | | | Capacity, % Compared to R404A Base | COP, % Compared to R404A Base |
|---|---|---|---|---|
| Case No. | Primary Refrigerant | Secondary Refrigerant | | |
| 1P | 449A | A1 | 92 | 94 |
| 1Q | 449A | A2 | 93 | 94 |
| 1R | 449A | A3 | 94 | 95 |
| 1S | 449A | A4 | 93 | 94 |
| 1T | 449A | A5 | 92 | 93 |

Medium Temperature Performance - Cases 1P-1T

Example 3A—Formation of a Centralized Refrigeration by Modifying Original System Using Existing Refrigerant R-407C and Replacing R407C in New Primary Loop with R448A and in New Secondary Loop with Refrigerants A1-A5

Example 1A is repeated except that the existing refrigerant is R407C. The following Table E3A demonstrates that excellent performance is achieved according to the systems and methods of the present invention as exemplified in this Example 3A, with results being reported relative to the base system of Comparative Example C1 with R407C as the sole refrigerant in the described centralized refrigeration system:

TABLE E3A

| | | | Capacity, % Compared to R404A Base | COP, % Compared to R404A Base |
|---|---|---|---|---|
| Case No. | Primary Refrigerant | Secondary Refrigerant | | |
| 1U | 448A | A1 | 97 | 92 |
| 1V | 448A | A2 | 97 | 92 |
| 1W | 448A | A3 | 99 | 93 |
| 1X | 448A | A4 | 97 | 92 |
| 1Y | 448A | A5 | 96 | 91 |

Medium Temperature Performance - Case 1T-1X

Example 31B—Formation of a Centralized
Refrigeration by Modifying Original System Using
Existing Refrigerant R-407C and Replacing R407C
in New Primary Loop with R449A and in New
Secondary Loop with Refrigerants A1-A5

Example 1B is repeated except that the existing refrigerant is R407C. The following Table E3B demonstrates that excellent performance is achieved according to the systems and methods of the present invention as exemplified in this Example 3B, with results being reported relative to the base system of Comparative Example C1 with R407C as the sole refrigerant in the described centralized refrigeration system:

TABLE E3B

| Medium Temperature Performance - Cases 1P-1T | | | | |
|---|---|---|---|---|
| Case No. | Primary Refrigerant | Secondary Refrigerant | Capacity, % Compared to R404A Base | COP, % Compared to R404A Base |
| 1Z | 449A | A1 | 95 | 91 |
| 1AA | 449A | A2 | 96 | 92 |
| 1AB | 449A | A3 | 97 | 93 |
| 1AC | 449A | A4 | 96 | 92 |
| 1AD | 449A | A5 | 95 | 91 |

Comparative Example C2—Centralized
Refrigeration System Using R-404A as Refrigerant
in a Low Temperature Application A centralized direct expansion refrigeration system having a cooling capacity of about 35 kW of the type disclosed in FIG. 1 is provided with R-404A as the existing refrigerant. The low temperature system operating conditions using R-404A as the refrigerant in the system of FIG. 1 are:

Cooling capacity: 35 kW
Isentropic efficiency: 55%
Volumetric efficiency: 100%
Condensing temperature: 45° C.
Subcooling: 0° C. (system with receiver)
Evaporator Superheat: 5.5° C.
Temperature rise in suction line: 10° C.
Evaporating temperature: −35° C.

While this system operates well from the standpoint of thermodynamic and heat transfer performance, it is highly undesirable from the standpoint of its environmental impact since the entire system contains the high GWP refrigerant R404A circulating throughout the entirety of a large and complex piping network.

Example 4A—Formation of a Centralized
Refrigeration by Modifying Original System Using
R-404A and Replacing R404A in New Primary
Loop with R448A and in New Secondary Loop
with Refrigerants A1-A5

The low temperature refrigeration system of Comparative Example C2, including the existing refrigerant R404A contained therein, is used as the starting point for the formation of an improved heat transfer system. The system is modified to produce a system of the present invention as generally described in connection with FIGS. 3A and 3B of Comparative Example 1.

The following Table E4A demonstrates that excellent performance is achieved according to the systems and methods of the present invention as exemplified in this Example 4A, with results being reported relative to the base system of Comparative Example C2 with R404A as the sole refrigerant in the described centralized refrigeration system:

TABLE E4A

| Low Temperature Performance - Case 1A-1E | | | | |
|---|---|---|---|---|
| Case No. | Primary Refrigerant | Secondary Refrigerant | Capacity, % Compared to R404A Base | COP, % Compared to R404A Base |
| 1A | 448A | A1 | 96 | 109 |
| 1B | 448A | A2 | 97 | 109 |
| 1C | 448A | A3 | 98 | 110 |
| 1D | 448A | A4 | 97 | 109 |
| 1E | 448A | A5 | 96 | 109 |

Example 4B—Formation of a Centralized
Refrigeration by Modifying Original System Using
Existing Refrigerant R-404A and Replacing R404A
in New Primary Loop with R449A and in New
Secondary Loop with Refrigerants A1-A5

Example 4A is repeated except that the new primary loop contains R449A. The following Table E4B demonstrates that excellent performance is achieved according to the systems and methods of the present invention as exemplified in this Example 4B, with results being reported relative to the base system of Comparative Example C2 with R404A as the sole refrigerant in the described centralized refrigeration system:

TABLE E4B

| Low Temperature Performance - Case 1F-1J | | | | |
|---|---|---|---|---|
| Case No. | Primary Refrigerant | Secondary Refrigerant | Capacity, % Compared to R404A Base | COP, % Compared to R404A Base |
| 1F | 449A | A1 | 95 | 108 |
| 1G | 449A | A2 | 95 | 109 |
| 1H | 449A | A3 | 97 | 110 |
| 1I | 449A | A4 | 96 | 109 |
| 1J | 449A | A5 | 94 | 109 |

Example 5A—Formation of a Centralized
Refrigeration by Modifying Original System Using
Existing Refrigerant R-407A and Replacing R407A
in New Primary Loop with R448A and in New
Secondary Loop with Refrigerants A1-A5

Example 4A is repeated except that the existing refrigerant is R407A. The following Table E5A demonstrates that excellent performance is achieved according to the systems and methods of the present invention as exemplified in this Example 5A, with results being reported relative to the base system of Comparative Example C2 with R407A as the sole refrigerant in the described centralized refrigeration system:

TABLE E5A

| Low Temperature Performance - Case 1K-1O | | | | |
|---|---|---|---|---|
| Case No. | Primary Refrigerant | Secondary Refrigerant | Capacity, % Compared to R407A Base | COP, % Compared to R407A Base |
| 1K | 448A | A1 | 94 | 95 |
| 1L | 448A | A2 | 94 | 95 |

TABLE E5A-continued

| | | | Capacity, % | COP, % |
| | Primary | Secondary | Compared to | Compared to |
| Case No. | Refrigerant | Refrigerant | R407A Base | R407A Base |
|---|---|---|---|---|
| 1M | 448A | A3 | 96 | 96 |
| 1N | 448A | A4 | 94 | 95 |
| 1O | 448A | A5 | 93 | 95 |

Low Temperature Performance - Case 1K-1O

Example 5B—Formation of a Centralized Refrigeration by Modifying Original System Using Existing Refrigerant R-407A and Replacing R407A in New Primary Loop with R449A and in New Secondary Loop with Refrigerants A1-A5

Example 4A is repeated except that the existing refrigerant is R407A. The following Table E5B demonstrates that excellent performance is achieved according to the systems and methods of the present invention as exemplified in this Example 5B, with results being reported relative to the base system of Comparative Example C2 with R407A as the sole refrigerant in the described centralized refrigeration system:

TABLE E5B

| | | | Capacity, % | COP, % |
| | Primary | Secondary | Compared to | Compared to |
| Case No. | Refrigerant | Refrigerant | R407A Base | R407A Base |
|---|---|---|---|---|
| 1P | 449A | A1 | 92 | 94 |
| 1Q | 449A | A2 | 93 | 95 |
| 1R | 449A | A3 | 94 | 96 |
| 1S | 449A | A4 | 93 | 95 |
| 1T | 449A | A5 | 92 | 95 |

Low Temperature Performance - Cases 1P-1T

Example 6A—Formation of a Centralized Refrigeration by Modifying Original System Using Existing Refrigerant R-407C and Replacing R407C in New Primary Loop with R448A and in New Secondary Loop with Refrigerants A1-A5

Example 4A is repeated except that the existing refrigerant is R407C. The following Table E6A demonstrates that excellent performance is achieved according to the systems and methods of the present invention as exemplified in this Example 6A, with results being reported relative to the base system of Comparative Example C2 with R407C as the sole refrigerant in the described centralized refrigeration system:

TABLE E6A

| | | | Capacity, % | COP, % |
| | Primary | Secondary | Compared to | Compared to |
| Case No. | Refrigerant | Refrigerant | R407C Base | R407C Base |
|---|---|---|---|---|
| 1U | 448A | A1 | 97 | 92 |
| 1V | 448A | A2 | 97 | 92 |
| 1W | 448A | A3 | 99 | 93 |
| 1X | 448A | A4 | 97 | 92 |
| 1Y | 448A | A5 | 96 | 91 |

Low Temperature Performance - Case 1U-1Y

Example 6B—Formation of a Centralized Refrigeration by Modifying Original System Using Existing Refrigerant R-407C and Replacing R407C in New Primary Loop with R449A and in New Secondary Loop with Refrigerants A1-A5

Example 4B is repeated except that the existing refrigerant is R407C. The following Table E6B demonstrates that excellent performance is achieved according to the systems and methods of the present invention as exemplified in this Example 6B, with results being reported relative to the base system of Comparative Example C2 with R407A as the sole refrigerant in the described centralized refrigeration system:

TABLE E6B

| | | | Capacity, % | COP, % |
| | Primary | Secondary | Compared to | Compared to |
| Case No. | Refrigerant | Refrigerant | R407C Base | R407C Base |
|---|---|---|---|---|
| 1Z | 449A | A1 | 95 | 92 |
| 1AA | 449A | A2 | 96 | 92 |
| 1AB | 449A | A3 | 98 | 93 |
| 1AC | 449A | A4 | 96 | 92 |
| 1AD | 449A | A5 | 95 | 92 |

Low Temperature Performance - Cases 1Z-1AC

Comparative Example C3A—Refrigeration System Using R-448A as Refrigerant in a Medium Temperature Application A direct expansion refrigeration system having a capacity of about 100 kW of the type disclosed in FIG. 1 is provided with R-448A as the existing refrigerant. The system operating conditions using R-448A as the refrigerant in the system of FIG. 1 are:

Cooling capacity: 100 kW
Isentropic efficiency: 65%
Volumetric efficiency: 100%
Condensing temperature: 45° C.
Subcooling: 0° C. (system with receiver)
Evaporator Superheat: 5.5° C.
Temperature rise in suction line: 10° C.
Evaporating temperature: −8° C.

While this system operates well from the standpoint of thermodynamic and heat transfer performance, it is highly undesirable from the standpoint of its environmental impact since the entire system contains the high GWP refrigerant R448A circulating throughout the entirety of a large and complex piping network.

Example 7A—Formulation of a Centralized Refrigeration by Modifying Original System Using R-448A and Leaving R448A in New Primary Loop and Using Refrigerants A1-A in New Secondary Loop The medium temperature refrigeration system of Comparative Example 3A, including the existing refrigerant R448A contained therein, is used as the starting point for the formation of an improved heat transfer system. The system is modified to produce a system of the present invention as generally described in connection with FIGS. 3A and 3B of Comparative Example 1, except that the existing refrigerant R448A in the primary loop equipment is not replaced.

The following Table E7A demonstrates that excellent performance is achieved according to the systems and methods of the present invention as exemplified in this Example 7A, with results being reported relative to the base system of Comparative Example C3 with R448A as the sole refrigerant in the described centralized refrigeration system:

TABLE E7A

| | | | Capacity, % Compared to R448A Base | COP, % Compared to R448A Base |
|---|---|---|---|---|
| Case No. | Primary Refrigerant | Secondary Refrigerant | | |
| 2A | 448A | A1 | 91 | 94 |
| 2B | 448A | A2 | 92 | 94 |
| 2C | 448A | A3 | 93 | 95 |
| 2D | 448A | A4 | 92 | 94 |
| 2E | 448A | A5 | 91 | 94 |

*Medium Temperature Performance - Case 2A-2E*

Comparative Example C3B—Centralized Refrigeration System Using R-449A as Refrigerant in a Medium Temperature Application Comparative Example C3A is repeated, except that the existing refrigerant is R-449A.

Example 7B—Formation of a Centralized Refrigeration by Modifying Original System Using R-449A and Leaving R449A in New Primary Loop and Using Refrigerants A1-A5 in New Secondary Loop The medium temperature refrigeration system of Comparative Example 3B, including the existing refrigerant R449A contained therein, is used as the starting point for the formation of an improved heat transfer system. The system is modified to produce a system of the present invention as generally described in connection with FIGS. 3A and 3B of Comparative Example 1, except that the existing refrigerant R449A in the primary loop equipment is not replaced.

The following Table E7B demonstrates that excellent performance is achieved according to the systems and methods of the present invention as exemplified in this Example 7B, with results being reported relative to the base system of Comparative Example C3B with R449A as the sole refrigerant in the described centralized refrigeration system:

TABLE E7B

| | | | Capacity, % Compared to R449A Base | COP, % Compared to R449A Base |
|---|---|---|---|---|
| Case No. | Primary Refrigerant | Secondary Refrigerant | | |
| 2F | 449A | A1 | 91 | 95 |
| 2G | 449A | A2 | 92 | 94 |
| 2H | 449A | A3 | 93 | 95 |
| 2I | 449A | A4 | 92 | 94 |
| 2J | 449A | A5 | 91 | 94 |

*Medium Temperature Performance - Case 2F-2J*

Comparative Example C4A—Centralized Refrigeration System Using R-448A as Refrigerant in a Low Temperature Application A centralized direct expansion refrigeration system having a cooling capacity of about 35 kW of the type disclosed in FIG. 1 is provided with R-448A as the existing refrigerant.

The low temperature system operating conditions using R-448A as the refrigerant in the system of FIG. 1 are:

Cooling capacity: 35 kW
Isentropic efficiency: 55%
Volumetric efficiency: 100%
Condensing temperature: 45° C.
Subcooling: 0° C. (system with receiver)
Evaporator Superheat: 5.5° C.
Temperature rise in suction line: 10° C.
Evaporating temperature: −35° C.

While this system operates well from the standpoint of thermodynamic and heat transfer performance, it is highly undesirable from the standpoint of its environmental impact since the entire system contains the high GWP refrigerant R448A circulating throughout the entirety of a large and complex piping network.

Example 8A—Formation of a Centralized Low Temperature Refrigeration System by Modifying Original System Using R-448A and Leaving R448A in New Primary Loop and Using Refrigerants A1-A5 in New Secondary Loop The low temperature refrigeration system of Comparative Example 4, including the existing refrigerant R448A contained therein, is used as the starting point for the formation of an improved heat transfer system. The system is modified to produce a system of the present invention as generally described in connection with FIGS. 3A and 3B of Comparative Example 1, except that the existing refrigerant R448A in the primary loop equipment is not replaced.

The following Table E8A demonstrates that excellent performance is achieved according to the systems and methods of the present invention as exemplified in this Example 8A, with results being reported relative to the base system of Comparative Example C4 with R448A as the sole refrigerant in the described centralized refrigeration system:

TABLE E8A

| | | | Capacity, % Compared to R448A Base | COP, % Compared to R448A Base |
|---|---|---|---|---|
| Case No. | Primary Refrigerant | Secondary Refrigerant | | |
| 2A | 448A | A1 | ~90 | 95 |
| 2B | 448A | A2 | 90 | 95 |
| 2C | 448A | A3 | 91 | 96 |
| 2D | 448A | A4 | 90 | 95 |
| 2E | 448A | A5 | ~90 | 95 |

*Low Temperature Performance - Case 2A-2E*

Comparative Example C4B—Centralized Refrigeration System Using R-449A as Refrigerant in a Low Temperature Application Comparative Example C4A is repeated, except that the existing refrigerant is R-449A.

Example 8B—Formation of a Centralized Low Temperature Refrigeration System by Modifying Original System Using R-449A and Leaving R449A in New Primary Loop and Using Refrigerants A1-A5 in New Secondary Loop The low temperature refrigeration system of Comparative Example 4B is used, including the existing refrigerant R449A contained therein, as the starting point for the formation of an improved heat transfer system. The system is modified to produce a system of the present invention as generally described in connection with FIGS. 3A and 3B of Comparative Example 1, except that the existing refrigerant R449A in the primary loop equipment is not replaced.

The following Table E8B demonstrates that excellent performance is achieved according to the systems and methods of the present invention as exemplified in this Example 8B, with results being reported relative to the base system of Comparative Example C4B with R449A as the sole refrigerant in the described centralized refrigeration system:

TABLE E8B

| | Low Temperature Performance - Case 2F-2J | | | |
|---|---|---|---|---|
| Case No. | Primary Refrigerant | Secondary Refrigerant | Capacity, % Compared to R449A Base | COP, % Compared to R449A Base |
| 2F | 449A | A1 | ~90 | 95 |
| 2G | 449A | A2 | 90 | 95 |
| 2H | 449A | A3 | 91 | 96 |
| 2I | 449A | A4 | 90 | 95 |
| 2J | 449A | A5 | ~90 | 95 |

The invention claimed is:

1. A method for forming an improved refrigeration system comprising:

a. providing an existing refrigeration circuit comprising: (i) an existing refrigerant having a GWP of greater than or equal to 1200; (ii) a plurality of evaporators located in or near a refrigerated space containing products accessible to consumers and (ii) at least one compressor or rack of compressors and at least one condenser located remotely from areas accessible to said consumers, wherein existing refrigerant from said condenser is fluidly connected to said evaporators via conduit(s) and wherein existing refrigerant vapor from said evaporators is returned via conduits to a suction side of said compressor or compressor rack;

b. disconnecting the fluid connection between said existing refrigerant from said condenser and at least one of said evaporators;

c. disconnecting the fluid connection between said existing refrigerant vapor from said at least one of said evaporators in step (b) and said suction of said compressor or compressor rack; and d. establishing a new first refrigeration circuit comprising said compressor or compressor rack and said condenser, wherein said existing refrigerant remains in said first refrigeration circuit or is removed and replaced;

e. establishing a new second refrigeration circuit comprising said at least one of said evaporators that has been disconnected in steps (b) and (c) by steps comprising: (i) removing said existing refrigerant from said evaporators and at least a portion of said conduits which have been disconnected in steps (b) and (c); (ii) replacing said removed existing refrigerant with a second refrigerant comprising: (1) from about 30% to about 70% by weight of CF3I; (2) from about 9% to about 58% by weight of HFO-1234yf; and (3) from 1% to about 21.5% by weight of HFC-32, provided the total of components (1)-(34) comprise at least 95% by weight of the second refrigerant, and wherein said second refrigerant: (i) has an Occupational Exposure Limit (OEL) greater than 400; (ii) is classified as class A1 by ASHRAE Standard 34; and (iii) has a GWP of about 150 or less; and f. thermally interconnecting said new first refrigeration circuit and said new second refrigeration circuit with an inter-circuit heat exchanger in which at least a portion of said refrigerant in said first circuit is vaporized by absorbing heat from said second circuit refrigerant vapor and wherein at least a portion of said second refrigerant is condensed by transferring heat to said first circuit refrigerant.

2. The method of claim 1 wherein said second refrigerant comprises: (1) from about 59% to about 69.5% by weight of CF3I; (2) from about 9% to about 19.5% by weight of HFO-1234yf; and (3) from 16.5% to about 21.5% by weight of HFC-32, provided the total of components (1)-(3) comprise at least 95% by weight of the second refrigerant.

3. The method of claim 1 wherein said second refrigerant comprises: (1) from about 32.8% to about 53.8% by weight of CF3I; (2) from about 29% to about 58% by weight of HFO-1234yf; and (3) from 2%±0.2% to about 16.5% by weight of HFC-32, and further comprises (4) 1±0.2 to 3.2±0.2% by weight of HFC-125, provided the total of components (1)-(4) comprise at least 95% by weight of the second refrigerant.

4. The method of claim 1 wherein said second refrigerant comprises: from about 41.5% to about 49.5% by weight of CF3I; (2) from about 36% to about 44% by weight of HFO-1234yf; and (3) from about 11% to about 15% by weight of HFC-32, and further comprises (4) 1±0.2 to 3.5±0.2% by weight of CO2, provided the total of components (1)-(4) comprise at least 95% by weight of the second refrigerant.

5. The method of claim 1 wherein said second refrigerant comprises: (1) from about 32.8% to about 53.8% by weight of CF3I; (2) from about 29% to about 58% by weight of HFO-1234yf; and (3) from 2%+/−0.2% to about 16.5% by weight of HFC-32, and further comprises (4) from 0.5% to 4% by weight of HFC-125, CO2 or a combination of HFC-125 and CO2, provided the total of components (1)-(4) comprise at least 95% by weight of the second refrigerant.

6. The method of claim 1 wherein said second refrigerant consists essentially of: (1) about 69.5% by weight of CF3I; (2) about 9% by weight of HFO-1234yf; and (3) about 21.5% by weight of HFC-32.

7. The method of claim 1 wherein said second refrigerant consists essentially of: 1) About 59% by weight of CF3I; (2) about 19.5% by weight of HFO-1234yf; and (3) about 21.5% by weight of HFC-32.

8. The method of claim 1 wherein said second refrigerant consists essentially of the following four components: (1) about 38% by weight of CF3I; (2) about 54% by weight of HFO-1234yf; and (3) about 5% by weight of HFC-32; and (4) about 3%+1/−0.2% HFC-125.

9. The method of claim 1 wherein said second refrigerant consists essentially of the following four components: (1) about 45% by weight of CF3I; (2) about 40% by weight of HFO-1234yf; and (3) about 13% by weight of HFC-32; and (4) about 2+1/−0.2% CO2.

10. The method of claim 1 wherein in said disconnecting step (b) said at least one of said evaporators comprises all of said evaporators.

11. The method of claim 1 wherein in said establishing step (e) said at least one of said evaporators comprises all of said evaporators.

12. The method of claim 1 wherein said second refrigerant has a full glide of from about 5° C. to about 20° C.

13. The method of claim 1 wherein said second refrigerant has a full glide of from about 5° C. to about 15° C.

14. The method of claim 1 wherein said existing refrigerant is 404A or 407A or 407C.

15. The method of claim 14 wherein said existing refrigerant is 404A, which is removed and replaced with R448A or R449A.

16. The method of claim 14 wherein said existing refrigerant is 407A, which is removed and replaced with R448A or R449A.

17. The method of claim 14 wherein said existing refrigerant is 407C, which is removed and replaced with R448A or R449A.

18. A method for forming an improved refrigeration system comprising:

a. providing an existing refrigeration circuit comprising: (i) an existing refrigerant having a GWP of greater than or equal to 1200; (ii) a plurality of evaporators located in or near a refrigerated space containing products accessible to consumers and (ii) at least one compressor or rack of compressors and at least one condenser located remotely from areas accessible to said consumers, wherein said existing refrigerant from said condenser is fluidly connected to said evaporators via conduit(s) and wherein existing refrigerant vapor from said evaporators is returned via conduits to a suction side of said compressor or compressor rack;

b. disconnecting the fluid connection between said existing refrigerant liquid from said condenser and at least one of said evaporators;

c. disconnecting the fluid connection between said existing refrigerant vapor from said at least one of said evaporators in step (b) and said suction of said compressor or compressor rack; and d. establishing a new first refrigeration circuit comprising said compressor or compressor rack and said condenser, wherein said existing refrigerant remains in said first refrigeration circuit or is removed and replaced;

e. establishing a new second refrigeration circuit comprising said at least one of said evaporators that has been disconnected in steps (b) and (c) by steps comprising: (i) removing said existing refrigerant from said evaporators and at least a portion of said conduits which have been disconnected in steps (b) and (c); (ii) replacing said removed existing refrigerant with a second refrigerant comprising: (1) from about 30% to about 75% by weight of CF3I; (2) from about 5% to about 60% by weight of HFO-1234yf; and (3) from 1% to about 22.5% by weight of HFC-32, provided the total of components (1)-(43) comprise at least 95% by weight of the second refrigerant, and wherein said second refrigerant: (i) has an Occupational Exposure Limit (OEL) greater than 400; (ii) is classified as class A1 by ASHRAE Standard 34; and (iii) has a GWP of about 150 or less; and f. thermally interconnecting said new first refrigeration circuit and said new second refrigeration circuit with an inter-circuit heat exchanger in which at least a portion of said refrigerant in said first circuit is vaporized by absorbing heat from said second circuit refrigerant vapor and wherein at least a portion of said second refrigerant is condensed by transferring heat to said first circuit refrigerant.

19. The method of claim 18 wherein said second refrigerant has a full glide of from about 5° C. to about 20° C.

20. The method of claim 19 wherein said second refrigerant has a full glide of from about 5° C. to about 15° C.

* * * * *